United States Patent [19]
Friedlander et al.

[11] Patent Number: 6,122,363
[45] Date of Patent: Sep. 19, 2000

[54] MULTI-PROTOCOL INTERFACE APPARATUS AT A SERVICE CONTROL POINT

[75] Inventors: Jay M. Friedlander, Colorado Springs; Jeffrey D. Olson, Monument, both of Colo.

[73] Assignee: MCI Communications Corp., Washington, D.C.

[21] Appl. No.: 09/122,131

[22] Filed: Jul. 24, 1998

[51] Int. Cl.[7] ........................................... H04M 3/42
[52] U.S. Cl. .......................... 379/230; 379/220; 379/201; 379/219; 379/242; 370/466
[58] Field of Search .................... 379/201, 207, 379/219, 220, 221, 224, 230, 242, 243, 244, 245, 246, 265; 370/466, 467, 469; 700/83

[56] References Cited

U.S. PATENT DOCUMENTS

| | | | |
|---|---|---|---|
| 5,414,762 | 5/1995 | Flisik et al. | 379/201 |
| 5,488,569 | 1/1996 | Kaplan et al. | 379/201 |
| 5,889,848 | 3/1999 | Cookson | 379/230 |
| 5,898,765 | 4/1999 | Teglovic et al. | 379/229 |
| 5,937,053 | 8/1999 | Lee et al. | 379/220 |

*Primary Examiner*—Krista Zele
*Assistant Examiner*—William J. Deane, Jr.

[57] ABSTRACT

A system that processes telecommunications calls from a switch to provide call services. The system supports transactional and conversational protocols. For conversational protocols, call context is maintained at a service control point during call processing. Transactional and conversational messages are mapped to and from a generic message structure to simplify the input and output interfaces of supported service applications. Service control points comprise Communications Servers and Transaction Servers. Communications Servers are coupled by a WAN to provide distributed processing and enhance reliability and load balancing. A method processes conversational protocol messages while maintaining call context at a Communications Server. A method supports multiple-service calls by redirecting processing from one Service Application executing on an original service control point to another Service Application without communicating with the originating switch between services. The other Service Application may execute on a separate service control point coupled to the original service control point by a WAN.

25 Claims, 20 Drawing Sheets

MULTI-PROTOCOL INTERFACE APPARATUS AT A SERVICE CONTROL POINT

BACKGROUND OF THE INVENTION

1. Field of the Invention

The present invention pertains generally to electrical communication systems and more particularly to message processing systems and methods in a communications network.

2. Definitions

Automatic Number Identification (ANI)—The number of the calling station, as used in "Caller ID".

Application Data Field (ADF)—A proprietary transactional messaging protocol having a message structure transported over an X.25 network. Each transaction between a switch and an SCP in a call involves a single request/response pair.

Automatic Failover—A process of automatically shifting operations from an online system to an alternate or redundant system after a failure of the first online system.

Data Access Point (DAP)—A version of a Service Control Point developed by MCI Communications Corp.

Fiber Distributed Data Interface (FDDI)—A high-speed networking standard. The underlying medium is fiber optics, and the topology is a dual-attached, counter-rotating Token Ring. The FDDI protocol has also been adapted to run over traditional copper wires.

Intelligent Network Application Protocol (INAP)—A conversational protocol that specifies the information to be exchanged between the different entities of an Intelligent Network functional model in terms of PDUs. The PDUs themselves represent remote operations in the scope of the TCAP. Versions of INAP include ANSI INAP (North America), ETSI INAP (Europe), and various proprietary versions, generically labeled "INAP+".

Intelligent Network (IN)—A category of telecommunications network that supports collect calls, 1-800 numbers, Virtual Private Networks, digital cellphone systems, and other services, and is based on Signaling System 7 to transfer information.

International Consultative Committee for Telegraphy and Telephony (CCITT)—A unit of the International Telecommunications Union (ITU) of the United Nations having representatives from the telecommunications companies of the world. The CCITT produces technical standards, known as "Recommendations," for all internationally controlled aspects of analog and digital communications.

Message Transfer Part (MTP)—Levels 1–3 of the SS7 protocol containing the necessary mechanisms for ensuring reliable functional signal message transmission and corresponding to the first three layers of the OSI reference model.

N00 Service—A service providing special area codes, such as toll-free 1-800 services.

Open Systems Interconnection (OSI)—The seven-layer, modular protocol stack defined by the International Standards Organization (ISO) for data communications between computers. Its layers are: Physical, Data Link, Network, Transport, Session, Presentation, and Application.

Protocol Data Unit (PDU)—A message of a given protocol comprising payload and protocol-specific control information, typically contained in a message header. PDUs pass over the protocol interfaces that exist between the layers of protocols (per the OSI model).

Signaling Connection Control Part (SCCP)—An SS7 protocol layer that connects sophisticated database management and OSI network service compatibility.

Signaling System 7 (SS7)—A family of signaling protocols originating from narrowband telephony and used to set-up, manage, share, and terminate connections as well as to exchange non-connection-associated information on a telecommunications network. The SS7 technology is a common channel signaling system based on CCITT Q.700.

Sub-System Number (SSN)—A value identifying an application executing on a specific Communications Server.

Supp Codes—Supplemental digits provided to the system, typically by the user or the user's local network system (e.g., billing numbers or user ID numbers).

Transaction Capability Application Part (TCAP)—A connectionless SS7 protocol for the exchange of information outside the context of a call or connection.

Virtual Private Network (VPN) Service—A private inter-corporation or intraorganization telephone network service, such as implemented by MCI Corporation's VNET™.

X.25—A packet switched data service having channels up to 64 kb/s and being based on the three lower levels of the OSI model.

3. Description of Related Art

Telecommunications network carriers use computing platforms, known generally as Service Control Points (SCPs), for real-time call processing of many services (such as a 1-800-service). An SCP is generally a computer and database platform coupled to a communications network switch for performing real-time processing of various telecommunications services by executing service logic programs to provide customer services. The SCP platforms are distinct from, and typically remote from, telecommunications network switches. A version of an SCP is referred to as a Data Access Point (DAP).

FIG. 1A illustrates a telecommunications network. When a call requiring a service, such as a 1-800 service, is initiated by a user at an originating telephone 150, a request message is received by the central office 154 via local telephone network 152. Systems at central office 154 determine, by searching a database, which long distance carrier, such as MCI Communications Corp., must service the 1-800 number. The systems at central office 154 then route the request message via public switched network 158 to switch 156, which belongs to the long distance carrier. The request message is then forwarded on the service network 160 to SCP 164 from switch 156 to perform the requested service. In this example, a Service Application running on SCP 164 determines the destination for the 1-800 call, and then responds to switch 156, indicating that the call may be connected with receiving telephone 170.

Switch 156 then sends a request message via SS7 network 172 to switch 162 to initiate the call with receiving telephone 170. The switch sends the request to central office 166 via public switched network 158. Central office 166 then routes the call to receiving telephone 170 via local telephone network 168. Additional request and responses messages may be communicated during the call, between the two telephones, between the two switches, and between one of the switches and the service control point, depending on the type of service required by the call and by the communications protocols supported by the system. FIG. 1 illustrates an overview of a portion of a telecommunications system and is generally not limited to a specific configuration or protocol.

FIG. 1B illustrates an exemplary SCP architecture. Each of a plurality of switches 100 in telecommunications network 101 have a dual data link 112 to each of three SCPs 102, 104, and 106 coupled by, for example, an FDDI ring. Each data link from a switch (e.g., 118) connects to two redundant Communications Servers 108 and 110 within SCP 102. On the back end, each Communications Server (e.g., 110) interfaces with a number of Transaction Servers 114 coupled by, for example, an FDDI ring 116. Transaction servers are grouped by services including, for example, Virtual Private Networks (VPN), N00, and Calling Card (CC) services. A single service such as N00 may actually be performed by multiple individual Service Applications. Communications Server 110 receives the request message, processes the communications protocol of the request message, and forwards it to a selected Transaction Server, such as 120. A Service Application executing on the Transaction Server processes the request and returns a response, which the Communications Server sends back to the switch. In a transactional messaging protocol, like ADF, the requested service completes with a single request/response pair. In a conversational messaging protocol, like INAP, a service typically requires a dialog of request/response messages to fully complete the requested service.

Service Applications are software programs that execute on a Transaction Server to process calls and messages for a particular service. Typically, a Transaction Server supports more than one service, and therefore, typically executes multiple specific Service Applications. For example, in a preferred embodiment, there are multiple redundant Transaction Servers for each service at a single SCP. In addition, there are multiple SCPs redundantly supporting every service at each SCP site. Accordingly, there are commonly nine Transaction Servers for each service at each SCP site. Furthermore, in an embodiment of the present invention, there are three SCP sites in a communications network. The Transaction Servers at each SCP are evenly load balanced: a switch evenly distributes its service request messages among the three redundant SCPs, and at each SCP, a Communications Server evenly distributes service request messages for a certain service among the three redundant Transaction Servers for that service.

For communications between switches and SCPs, a transactional messaging protocol referred to as Application Data Field (ADF) messaging may be used. Application Data Field messaging includes a transactional message structure that is transported over an X.25 network employing a single request/response message exchange process for a single service call in which a switch sends a request message to the SCP, and the SCP returns a response message to the switch. This single exchange of messages typically completes the processing for a single-service call, although some types of ADF calls might require multiple services and, therefore, multiple request/response exchanges.

When originating switch 118 receives an ADF call that requires SCP processing, it sends a service request message to SCP 102. Communications Server 110 at SCP 102 receives the service request message, determines which service is needed, and forwards the message to an appropriate Transaction Server 120. Communications Server 110 determines the appropriate Transaction Server based on services supported by each Transaction Server and the relative loading of each Transaction Server. A Service Application on selected Transaction Server 120 processes the service requested message, and generates a service response message. The service response message is returned to the same Communications Server 110, which then forwards the service response message to the same switch 118. This procedure is an exemplary process for standard calls. Thereafter, although multiple redundant Transaction Servers may be available for a particular service, a single Transaction Server is typically used to completely process the individual call.

Accordingly, the context data of an individual call is maintained by the switch or by the single Transaction Server, as shown by FIG. 2, throughout call processing, where the entire call is processed by Transaction Server A. For ADF transactions, call context is typically managed by a switch or originating station and passed to all system components in single request/response transactions. In FIG. 2, the switch sends a service request message to the Communications Server which performs some protocol processing and passes the service request to the appropriate Transaction Server (in this example, Transaction Server A). After completing the requested service, Transaction Server A returns a service response message to the Communications Server, which repackages the service response for communication to the switch. All necessary context data flows along with the service request/response message. This cycle typically completes a call, although, for example, multi-service calls may require multiple transactions to access multiple services.

Another messaging protocol is an SS7 messaging protocol known as Intelligent Network Application Part (INAP). The INAP protocol occupies a top layer of an SS7 protocol stack, riding on what is referred to as the Transaction Capability Application Part (TCAP) message. Unlike ADF, INAP is a conversational protocol in which several messages are exchanged between the switch and the SCP in processing a single call. Each message may be considered a stage in the processing of a multiple stage call dialog.

In the current communications business environment, many alliances are formed in which the network of one carrier must be integrated with the network of another carrier. Often this need requires one carrier's SCP to interface with more than one network, typically involving support for more than one protocol for switch interfacing. For example, an SCP interface to switches using ADF may also be required to interface with switches using various versions of INAP. Furthermore, this need may also extend to additional protocols not discussed herein.

Conversational messaging protocols such as INAP involve several messages exchanged between the switch and SCP in processing an individual call. In one approach, just as an individual call is processed by a single Transaction Server A in an ADF message exchange, a Communications Server supporting an INAP message exchange preferably ensures the same Transaction Server is used to complete the entire message exchange. This approach compromises the load balancing and automatic failover features provided by a multiple Transaction Server architecture. For example, if a Transaction Server fails during the processing of a call, another Transaction Server cannot take over processing because the current context of that call is lost when the first Transaction Server fails. As a result, need exists for a system and method of processing conversational message exchanges using multiple Transaction Servers. Likewise, a need exists for a system and method for supporting multiple protocols, both single request/response and conversational protocols, at a single SCP and among multiple load balanced Transaction Servers, potentially located at different SCPs.

BRIEF SUMMARY OF THE INVENTION

Systems in accordance with the present invention process calls according to a conversational protocol in a service control point. Individual stages of a call defined by a conversational protocol may be processed by different service applications within the originating service control point or at a remote service control point coupled thereto by a communications network. When a call requires processing of multiple services, a first stage of the call processing a first service may be transferred to a second stage of the call processing a second service without requiring communication with a switch between the processing of each service. Such transfer may be accomplished within a single service control point or among multiple service control points coupled by a communications network.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, in accordance with the purposes of the present invention, as embodied and broadly described herein, the system for processing a call received from a switch, wherein the call has a first service request message that includes a dialog identifier and defines a first stage of the call, includes a switch interface coupled to receive the first service request message from the switch; a storage device coupled to the switch interface; a call context data record being storable in the storage device with reference to the dialog identifier; and a first service application coupled to receive the first service request message and the call context data record from the switch interface and to process the first stage of the call based on the first service request message and the call context data record.

The present invention may also comprise, in accordance with its objects and purposes, a method for processing in a service control point a request message having a dialog identifier and a service key, including the acts of storing at least one call context data record in the service control point; receiving the request message in the service control point; selecting one of the at least one call context data records based on the dialog identifier of the request message; selecting a service application based on the service key, the service application having a processing sequence including multiple stages; sending the request message and the selected call context data record to the selected service application; processing the request message beginning at a proper processing point in the selected service application determined based on the request message and the selected call context data record; modifying the selected call context data record responsive to the processing of the request message; and storing the selected call context data record at the service control point, responsive to the modifying step.

The systems and methods in accordance with the present invention overcome the disadvantages and limitations identified in related art. A single SCP can support a conversational protocol while using different Transaction Servers and Service Applications to process different stages of the call dialog, thereby preserving the capabilities of load balancing and automatic failover. In part, this capability is accomplished by storing the context of each call on a Communications Server relative to each stage of a conversational protocol dialog. In this manner, at each stage in a call dialog, the Communications Server can forward a request message and the call context to any available Transaction Server that supports the requested service, regardless of whether that Transaction Server was involved in a previous stage in the dialog or whether the Transaction Server is even located on the same SCP. Moreover, these capabilities are achieved substantially independent of the switch (i.e., no enhanced intelligence is required in the switch).

In addition, SCPs are coupled by a communications network, such as a WAN, to allow other SCPs to process a request message initiated at an original SCP, thereby enhancing load balancing and automatic failover capabilities, and providing capabilities to support a specialized SCP configuration. In accordance with the present invention, SCPs can also redirect a multiple-service call from a switch between appropriate service applications without requiring communication with the switch between services.

DETAILED DESCRIPTION OF THE INVENTION

Figure 3:
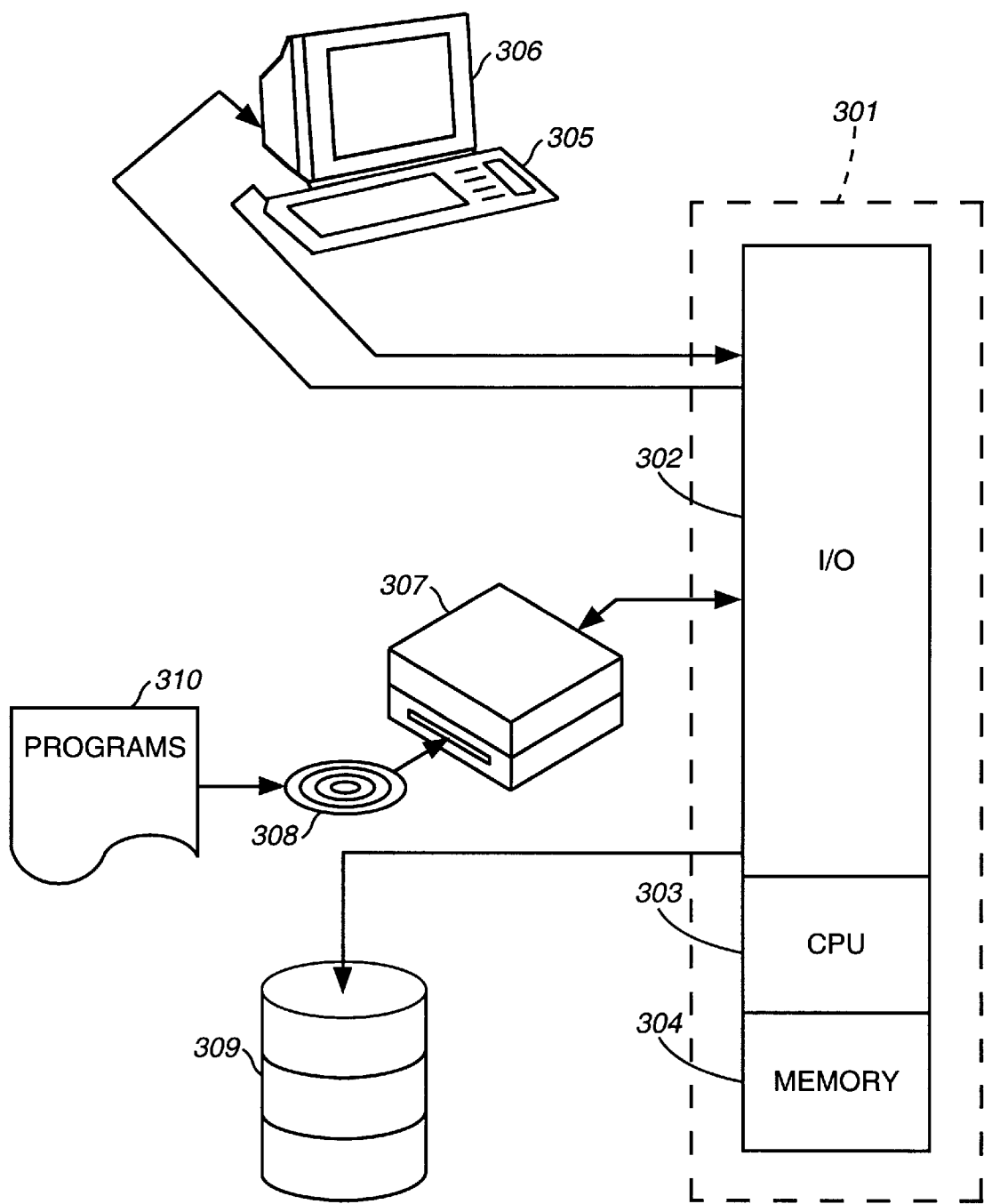
FIG. 3 depicts a general purpose computer in accordance with the present invention.

One operating element useful in accordance with the present invention is the general purpose computer. In such a system, data and program files may be input to the computer, which reads the files and executes the programs therein. Some of the elements of a general purpose computer are shown in FIG. 3, wherein a processor 301 is shown having an input/output (I/O) section 302, a Central Processing Unit (CPU) 303, and a memory section 304.

The I/O section 302 is connected to keyboard 305, display unit 306, disk storage unit 309, and disk drive unit 307. Generally, in contemporary systems, the disk drive unit 307 is a CD-ROM driver unit capable of reading a CD-ROM medium 308, which typically contains programs 310 and data. Computer program products containing mechanisms to effectuate the system and methods in accordance with the present invention may reside in the memory section 304, on a disk storage unit 309, or on the CD-ROM medium 308 of such a system. Alternately, disk drive unit 307 may be replaced by a floppy drive unit, a tape drive unit, or other storage medium drive unit. Examples of such systems include Digital Equipment Corporation (DEC) ALPHA systems running OpenVMS, SPARC systems offered by Sun Microsystems, Inc., personal computers offered by IBM Corporation and by other manufacturers of IBM-compatible personal computers, and other systems running the UNIX-based operating system. In accordance with the present invention, procedural components of a program product may be executed by CPU 303, and the program product and associated data may be stored on disk storage unit 309, disk drive unit 307 or other storage medium drive unit coupled to such system.

A Communications Server is generally a general purpose computer executing specialized software to provide functions such as protocol conversion, allocation of service requests to selected Transaction Servers, and receipt of service responses. Special purpose computers may also be designed to perform the functions of a Communications Server. A Communications Server provides a switch interface between a service application and a communications switch. Generally, a switch interface manages communications, directly or indirectly, between a switch and a service application, in part, by providing protocol processing for an SCP. A Transaction Server is generally a general purpose computers that executes specialized service applications for providing call services to a communications network. In an embodiment of the present invention, these servers are Digital Equipment Corporation systems having ALPHA processors running OpenVMS, although other general purpose systems are also available in accordance with the present invention. A Transaction Server may also be combined with a Communications Server in a switch interface. Furthermore, in an embodiment in accordance with the present invention, Transaction Servers are clustered for reliability and automatic failover using DECNet routing from DEC over an FDDI ring that couples the Communications Servers and Transaction Servers at a particular SCP.

Figure 1A:
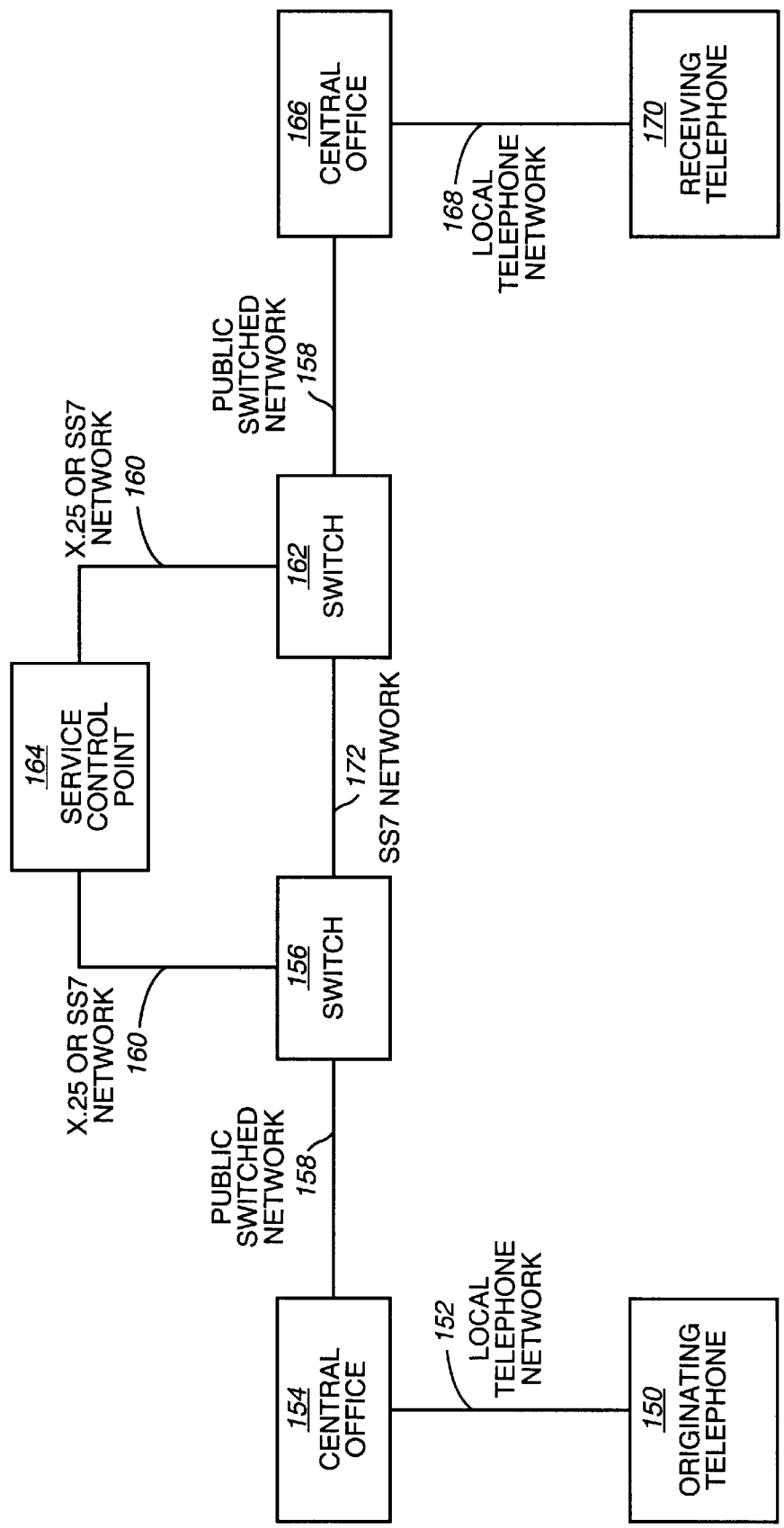
FIG. 1A depicts an overview of a telecommunications network including a Service Control Point.
Figure 1B:
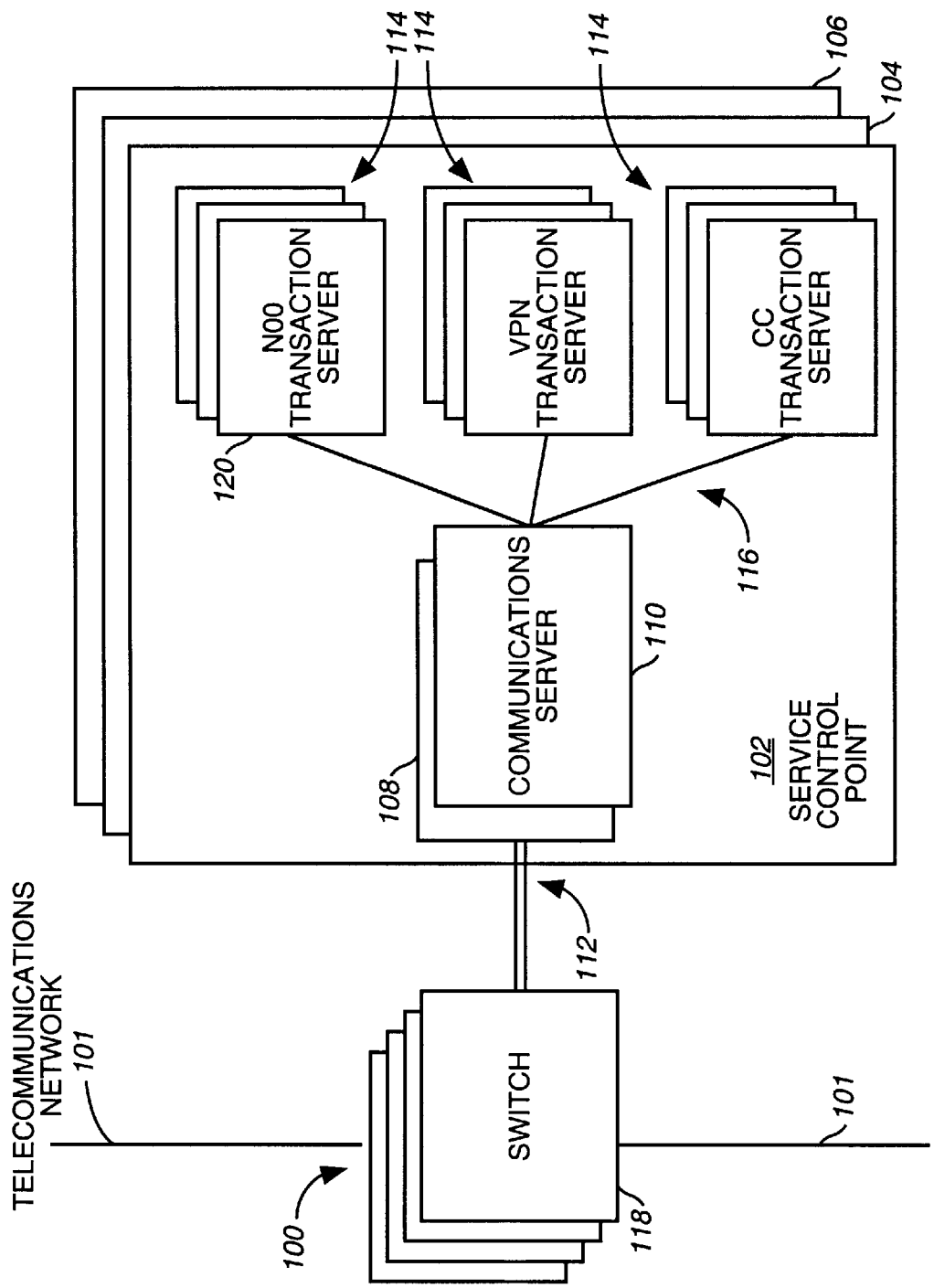
FIG. 1B depicts an overview of an SCP including Communications Servers and Transaction Servers.
Figure 2:
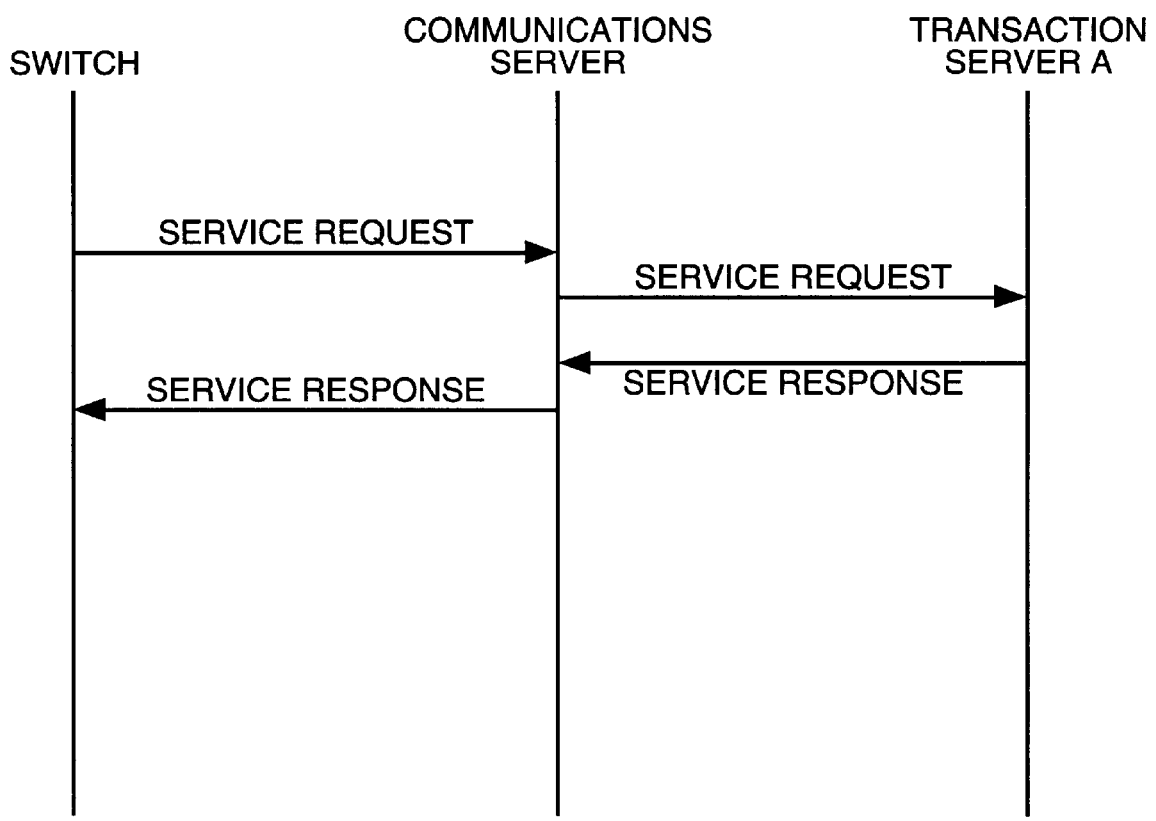
FIG. 2 depicts message flow employing a transactional protocol, such as ADF.

Call processing involving a single service request/service response message exchange inherently occurs on a single Transaction Server, as illustrated in FIG. 2. In contrast, call processing involving a conversation protocol comprises a dialog of requests/responses, and it is preferable to distribute individual requests/response pairs among multiple Transaction Servers to support load balancing and automatic failover features.

Figure 4:
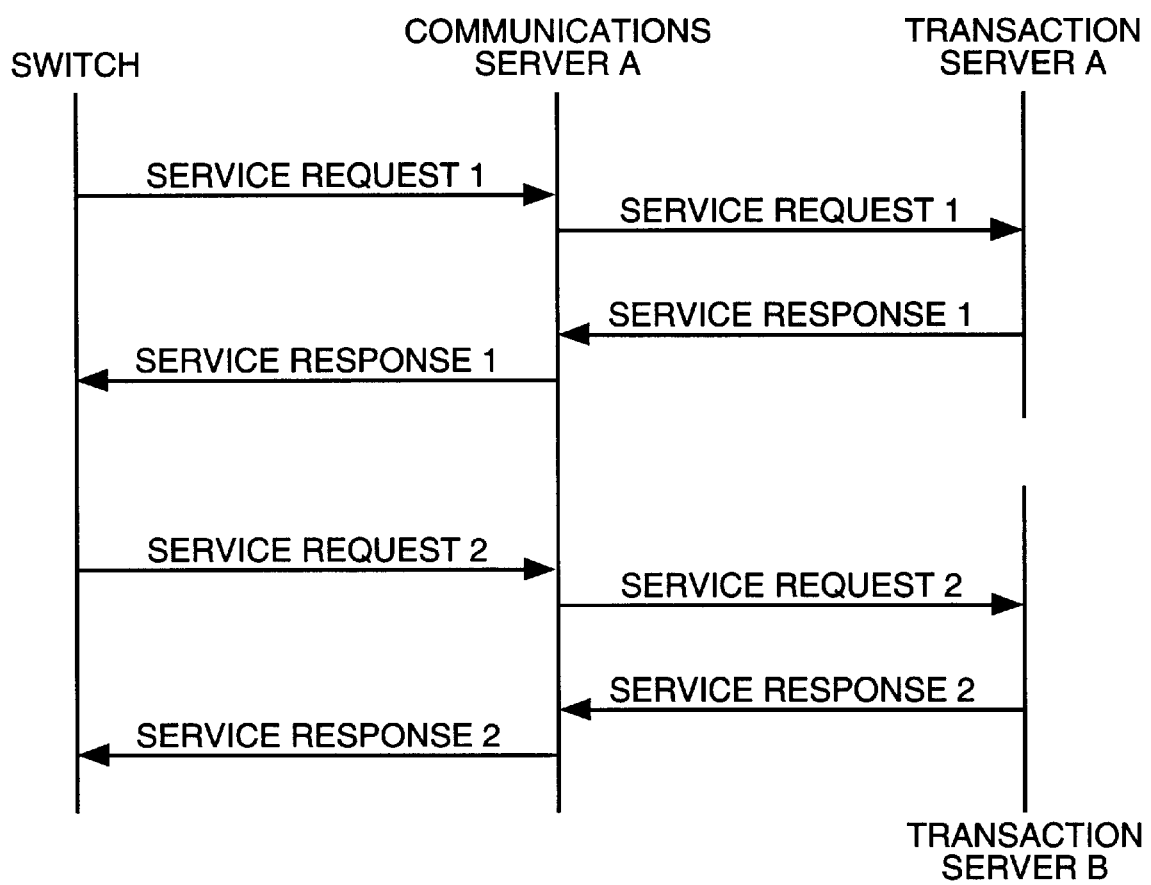
FIG. 4 depicts message flow employing a conversational protocol.

FIG. 4 shows an INAP dialog between a switch and an SCP, comprising Communications Server A and multiple Transaction Servers. As shown, Communications Server A receives service request 1 (e.g., "PROVIDE INSTRUCTIONS") and sends the request to Transaction Server A. Formats and codes for the INAP protocol are defined in Ericsson's Protocol for Intelligent Networks, Version 2 (Formats & Codes), 2/155 17-CRT 249 01 Rev. B, specifically incorporated by reference for all it discloses and teaches. Portions of a service request/response may be stripped away or supplemented as the message is passed among Communications Servers, Transaction Servers, Service Applications, and switches. Furthermore, Communications Server A selects the appropriate Transaction Server to receive the request message based on Transaction Server availability and a Service Key included in the service request. Accordingly, the Communications Server distributes the service request only to an available Transaction Server that supports the service indicated by the Service Key. Transaction Server A returns service response 1 (e.g., "MONITOR") and call context to Communications Server A. Service response 1 is then communicated to the switch.

In the next stage of the dialog, the switch sends service request 2 (e.g., "EVENT") to Communications Server A which, in this example, transfers the request and call context to Transaction Server B. The optional redirection to Transaction Server B might result for several reasons, including a server failure or excessive loading at Transaction Server A. Transaction Server B performs the requested function and returns service response 2 (e.g., "ACTIVE RESOURCE") response and call context to Communications Server A which then transmits service response 2 to the switch. By distributing the individual messages of the conversational dialog among multiple Transaction Servers, a system in accordance with the present invention can distribute individual INAP messages to the least loaded Transaction Server coupled to the Communications Server to perform load balancing. Alternately, the Communications Server can resend a request to a second Transaction Server if a first Transaction Server fails while processing the request (automatic failover).

Figure 5A:
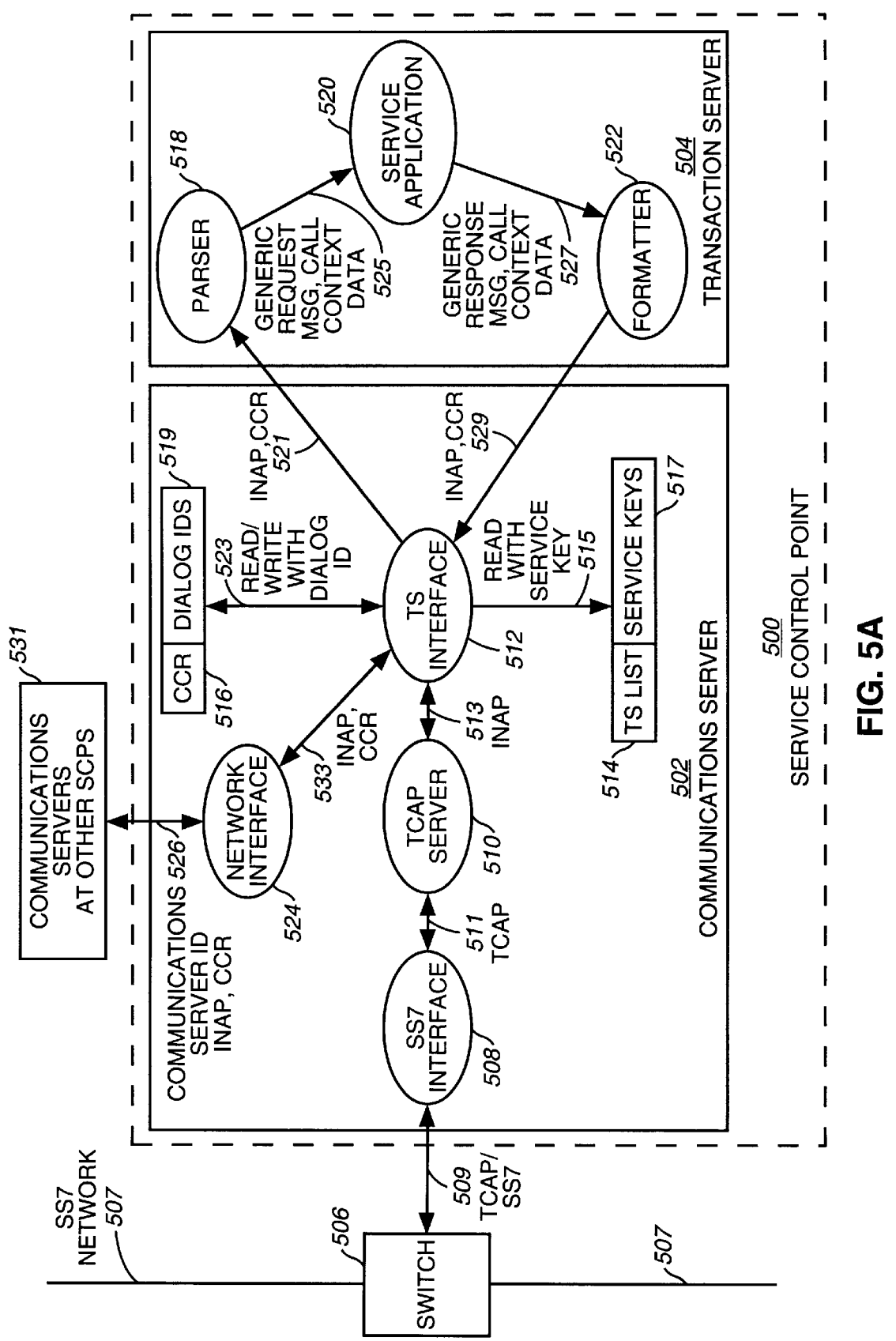
FIG. 5A depicts an SCP employing call context data and generic request/response messages.

FIG. 5A illustrates an SCP architecture supporting INAP messaging in accordance with the present invention. The SCP 500 comprises Communications Server 502 and Transaction Server 504. As previously described, telecommunications switch 506 is connected to telecommunications network 507 and is typically coupled to multiple Communications Servers, each of which is preferably coupled to multiple Transaction Servers. Communications Server 502 is equipped with an SS7 Interface 508, which receives TCAP/SS7 message 509 from switch 506 and processes the SCCP and MTP parts of message 509. The SS7 Interface 508 also passes the TCAP portion 511 of the message to TCAP Server 510 (an example of a protocol server), which extracts the INAP portion 513 of the TCAP message and passes it to Transaction Server (TS) Interface 512. A typical TCAP definition includes a Dialog Identifier (Dialog ID), which maintains a multi-message exchange dialog between two components (switch and Communications Server); a subsystem number (SSN), which identifies a specific Communications Server application in a network; and a Service Key. The SSN, in conjunction with the Dialog ID, insures that a switch sends each TCAP message for a single call dialog to the same Communications Server at the same SCP. The Service Key identifies the requested service to be invoked.

To initiate a call dialog, switch 506 sends an initial service request message to Communications Server 502, which in INAP is a "PROVIDE INSTRUCTIONS" message. The INAP protocol supports multiple requests, which are fully described in INAP specification documents available from the International Telecommunication Union (ITU), Place des Nations, CH-1211 Geneva 20, Switzerland (Web site: www.itu.int). An operation represents an INAP message type (e.g., PROVIDE INSTRUCTIONS, EVENT, etc.), in which the receiving process performs a specific operation in a stage of the call dialog, in accordance with the message type.

When TCAP Server 510 extracts INAP message 513, it parses a Service Key 515, which is used by TS Interface 512 (TS Interface) to locate an available Transaction Server (in Transaction Server List 514 (TS List)) to process the service request message. The TCAP Server 510 passes the extracted INAP message to the Transaction Server Interface 512, which accesses TS List 514 with Service Key 515. The TS List 514 stores a list of Transaction Servers associated with a list of Service Keys 517. The TS Interface 512 references TS List 514 with the Service Key 515 from the current service request to select a specific Transaction Server to receive the current service request message. The TS Interface 512 uses a round-robin algorithm to balance and distribute all inbound messages among the multiple Transaction Servers coupled to Communications Server 502 that support the requested service.

Communications Server 502 maintains call context data for certain calls that are being processed. A "call" is generally an association between two or more users or between a user and a network entity that is established by the use of network capabilities. This association may have zero or more connections and one or more stages (i.e., a call may comprise multiple stages). Generally, the "context" of a call is data identifying the relevant connections and the current phase or stage of such connections and/or other state information for the call.

Generally, a "call context data record" refers to a data structure containing call context data. In one form, a call context data record is stored and communicated as a generic call context data structure processed on a Transaction Server (see an example in Table 1). Fields other than those shown in Table 1 may also be added to a generic call context data structure to assist in processing service. A generic call context data structure is preferably a C-language data structure that uses pointers to minimize the aggregate amount of data passed between modules in a Transaction Server. If a field is unused, a convention indicates that the field is unused (e.g., a null pointer indicates "unused field"). The generic call context data structure includes a pointer to a corresponding generic request message structure, a pointer to a corresponding generic response message structure, pointers to service-specific data including a VPN context area, a N00 context area, and a common service context area, other service-specific data, such as the current processing state of the corresponding service application, and a transfer record pointer, which, if non-null, points to a transfer record data structure (see an example in Table 2) having information required to transfer processing to a second Service Application before sending a response message to the switch.

Fields other than those shown in Table 2 may also be added to a transfer record to assist in processing the service transfer.

TABLE 1

Examples of fields stored in a Generic Call Context Data Structure

| Data Type | Field Name | Description |
| --- | --- | --- |
| unsigned char | *req_msg_ptr | Pointer to a protocol-formatted request message |
| unsigned char | *resp_msg_ptr | Pointer to a protocol-formatted response message |
| GENERIC_REQ_MSG | *gen_req_msg_ptr | Pointer to a generic request message data structure |
| GENERIC_RESP_MSG | *gen_resp_msg_ptr | Pointer to a generic response message data structure |
| void | *vpn | Pointer to a VPN-specific context area |
| void | *n00 | Pointer to an N00-specific context area |
| void | *common | Pointer to a context area generally common to all services |
| CP_INAP_CTX | *inap_xfr_ptr | Pointer to a transfer record used for transferring service between an N00 service application and a VPN service application without routing a response message through a switch |

TABLE 2

Examples of fields stored in a Transfer Record data structure

| Data Type | Field Name | Description |
| --- | --- | --- |
| unsigned char | dataformat | Indicates whether the access is REMOTE or REGISTERED |
| SCP_GBLSW_DAT | glbsw | Global Switch Data used in transferring a request to a second service application. |
| unsigned char | pt_of_entry[2] | ID of the point of entry |
| unsigned char | pt_of_origin[2] | ID of the point of origin |
| union | un | Union of REM_FMT data type and a REG_FMT data type, depending on setting in dataformat (above) |

Figure 5B:
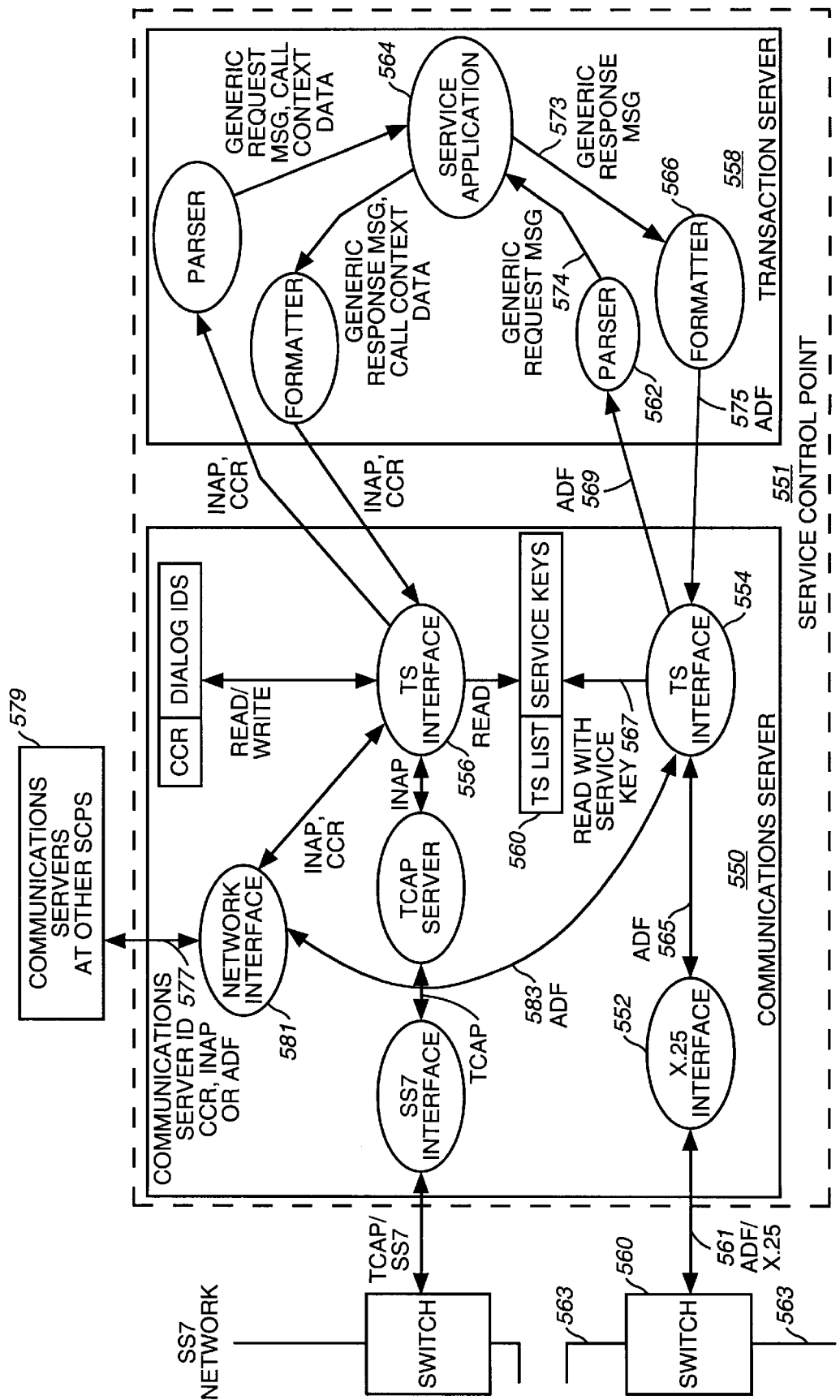
FIG. 5B depicts an SCP supporting both a conversational protocol and a transactional protocol employing call context data and generic request/response messages.
Figure 5C:
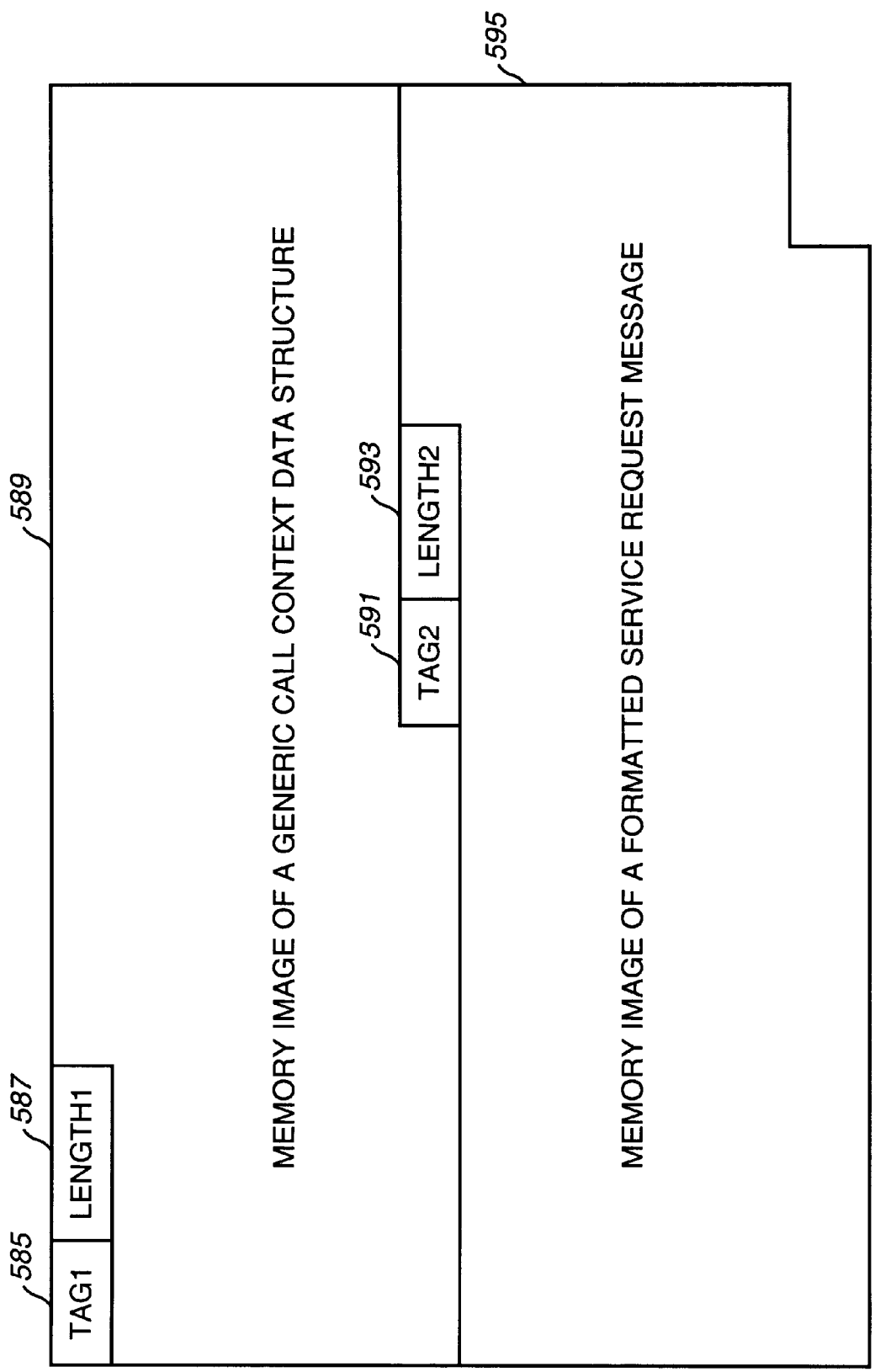
FIG. 5C depicts an example of a Call Context Record (CCR) data structure.

In a second form, a call context data record is stored and communicated as a Call Context Record (CCR) that is periodically stored in memory buffer 516 on Communications Server 502 after the CCR is initiated by a Transaction Server (see the example in FIG. 5C). The TS Interface 512 selects an appropriate CCR from memory buffer 516 based on Dialog ID 523 when a request is received from a switch. The TS Interface 512 also writes a CCR to memory buffer 516 based on Dialog ID 523 when a response is received from a Transaction Server. The CCRs are stored in memory buffer 516 in accordance with a list of Dialog IDs 519, also stored in memory buffer 516.

A CCR is preferably a C-language data structure which, in contrast to a C-language data structure having multiple fields of different data types and data elements, typically defines a contiguous block of memory having a specified length, although other data storage structures (such as a linked-list) are also possible. Although C-language is used in an embodiment of the present invention, other programming languages may be used within the scope of this invention, including assembly language and C++. The CCR is initiated by a Transaction Server in response to generic call context data generated by a Service Application. The Formatter module 522 maps the generic call context data structure, and all data structures directly or indirectly referenced by the generic call context data structure, into the CCR. Once created, the CCR is communicated between the Transaction Server and the Communications Server, as needed, for the duration of the call. During the call, the Service Application may supplement, replace, or eliminate data in the generic call context data structure, which is periodically loaded into the CCR for transmission to a Communications Server, to maintain an accurate context snapshot.

The CCR comprises a block of memory containing one or more variable-length records in a tag/length/data format. Each tag represents a specific data record. While many possible records may be defined to encompass all possible context data for all possible message and dialog types, only data records that are populated with data are included in the CCR, thereby minimizing the size of the CCR and minimizing the network bandwidth used when communicating the CCR between a Communications Server and a Transaction Server. For example, in FIG. 5C, TAG1 field 585 refers to a generic call context data structure having a length specified by LENGTH1 field 587. The TAG1-specified data structure 589 follows and is the memory image of the generic call context data structure. The TAG2 field 591 refers to a protocol-formatted request message that is referenced by a pointer in the generic call context data structure (see, for example, Table 1) having a length specified by LENGTH2 field 593. The TAG2-specified data structure 595 follows and is the memory image of the protocol-formatted request message referenced in the context data. Notice that, in this example, there is no record for an unformatted response message, which would be the case when a CCR is being initially transferred to a Transaction Server because no response message has been generated by the Transaction at this point in the request loop, thereby minimizing the bandwidth required to transmit this CCR to a Transaction Server.

Each memory image includes component data fields supported in the corresponding data structures. Examples of typical call context data fields include ANIs, Country Codes, Carrier Identification Codes (CICs), various types of Supp Codes, destination addresses, various types of service or feature indicators, event type indicators, and so on.

The TS Interface 512 sends an INAP message and the CCR to the selected Transaction Server 504 on communication link 521. At Transaction Server 504, a Parser Module 518 converts the INAP message to a generic request message and converts the CCR data into a generic call context data structure. A generic request message is a defined data structure that supports all messaging protocols supported by the SCP. In an embodiment of the current invention, the data structure is defined in C language. While C is the programming language used in an embodiment of the Transaction Server, other languages could also be used in accordance with the present invention. Parser 518 maps the fields of the INAP message into the data structure of the generic request message. Parser 518 also maps the data in the CCR 516 to a generic call context data structure representing call context data. Accordingly, a generic call context data structure can store a call context data record mapped from a CCR. The generic call context data structure holds a pointer to the corresponding generic request and response messages. The generic call context data structure (including a pointer to the generic request message) is then sent via communications link 525 to the Service Application 520 for processing.

A distinct Parser type is used for each switch protocol (e.g., INAP, INAP+, and ADF). Each Parser type converts messages to the same generic request message structure allowing a single Service Application, which receives and processes the generic request messages, to be used for every switch protocol supported. Preferably, a Parser is statically or dynamically linked to each Service Application from a reusable library that includes a Parser type for each switch protocol. A Parser also maps CCR data into a generic call context data structure.

A generic request message is preferably a C-language data structure including a message type field indicating the type of message (e.g., INAP "PROVIDE INSTRUCTIONS", INAP "EVENT"), ADF-specific fields, TCAP-specific fields, INAP-specific fields, a calling number field, a called number field, an authorization code field, a billing number field, a destination address field (indicating a translated internal designation of the called number), and an original switching trunk field. A generic response message is preferably a C-language data structure including a message type field, ADF-specific fields, TCAP-specific fields, INAP-specific fields, INAP+fields, an action code (indicating routing and error information), a dialing plan information field (populated by data extracted from a database coupled to a Service Application), a partition number and other routing fields, and a destination address field. Although C-language is used in an embodiment of the present invention, other programming languages may be used within the scope of this invention, including assembly language and C++.

Service Application 520 uses the INAP message type (which has been mapped to an attribute of the generic message) and the generic call context data structure to determine the proper processing of the call. For example, if the INAP message type is "PROVIDE INSTRUCTIONS", Service Application 520 will begin processing at the starting point of the application. Other message types (e.g., EVENT) cause Service Application 520 to begin processing at some mid-point in the application. Furthermore, refinement of a processing point can be determined and verified using call context data. For example, an EVENT message from a switch may provide digits for a Supp Code collected from a caller. Since there may be several types of Supp Codes needed for a call, the call context data is used to determine which Supp Code has been collected and at which point in the Service Application processing is to continue.

Service Application 520 has an Event module, which is preferably a CASE statement module in a C-language program, to process an EVENT message. The EVENT messages are typically received after a message dialog is initiated with an SCP. Other control flow constructs may be used to effect equivalent functionality using C-language or other programming languages. There are, however, different types of EVENT messages, including those associated with the return of Supp Codes and the response to a busy signal when the call can be redirected to an alternate destination (such as a secretary's phone). The Event module determines which type of EVENT message has been received and, consequently, where in the Service Application to continue processing. For example, a particular Event may result from the collection of a calling card number (an example of a Supp Code). The EVENT module determines the nature or type (i.e., calling card collection event) of the event and forwards the calling card number to the calling card portion of the Service Application indicating that processing should continue from the processing point at which the calling card number is to be received as input. Once the EVENT type has been determined, the program code associated with that EVENT evaluates the call context to determine whether the detected event corresponds with the current call context. If the EVENT type and the current call context correspond, processing continues from that processing point in the Service Application using data provided by the EVENT message and data in the generic call context data structure. If there is no such correspondence, the Service Application performs appropriate error recovery.

Service Application 520 processes the generic request message and returns a generic response message. During execution of Service Application 520, call context data in the generic call context data structure may be updated by the Service Application with a generic response message and new call context data. The generic call context data structure (now including a generic response message) is provided then sent via communications link 527 to Formatter 522. If the generic call context data structure includes call context data provided by Service Application 520, Formatter 522 creates or obtains memory for a CCR if a CCR for this call has not already been obtained. A distinct Formatter type is used for each switch protocol (e.g., INAP, INAP+, ADF). Each Formatter type converts the generic response message to a protocol message of the appropriate type, in a manner similar (only reversed) to the field mapping performed by Parser 518. Preferably, a Formatter is statically or dynamically linked to each Service Application from a reasonable library that includes a Formatter type for each switch protocol. Formatter 522 also loads the generic call context data structure into the CCR. Formatter 522 then sends the INAP response message and the CCR via communications link 529 to TS Interface 512 on Communications Server 502. The CCR is stored in memory buffer 516 on Communications Server 502 for the next message exchange, until the entire call dialog is completed. When the call is complete, the CCR structure is made available for use in another call dialog.

To complete the process, TS Interface 512 sends the INAP message 513 (the service response message) to TCAP Server 510, which encapsulates the INAP message into a TCAP message 511. The TCAP message 511 is sent to switch 506 via SS7 Interface 508, which also controls the MTP and SCCP portions of the SS7 messaging.

Also shown in FIG. 5A is network interface 524 on Communications Server 502. A Communications Server at one SCP may be connected to other Communications Server 531 via a communications network 526, including a LAN, WAN or other data communications network. Protocols such as IP or DECNet can be used to independently interface the Communication Servers in a communications network over this network. In an exemplary embodiment of the present invention, network interface 524 is coupled to TS Interface 512 via communications link 533 to receive INAP messages and CCRs and transmit messages (in a form including an INAP message, a CCR, and a original Communications Server ID) among other SCPs coupled to network 526.

FIG. 5B illustrates an SCP architecture supporting multiple messaging protocols in a single SCP 551. Communications Server 550, in addition to the components of Communications Server 502 of FIG. 5A, also includes X.25 interface 552 to support ADF messaging from switch 560 over an X.25 network 563. The X.25 network interface 552 on Communications Server 550 receives ADF/X.25 messages 561 and passes the ADF portion 565 of the message to TS Interface 554. The TS Interface 554 differs slightly from TS Interface 512 of FIG. 5A (also shown as TS Interface 556 of FIG. 5B), due to the differences between ADF and INAP. The TS Interface 554 extracts a Service Key 567 from ADF message 565, and references TS List 560 to identify the appropriate Transaction Server to process the request message. Since ADF is a single message exchange protocol, no special call context is needed for communication with the Transaction Server 558. All necessary information is communicated in the ADF request message itself on communications link 569. The TS Interface 554 selects a Transaction Server from TS List 560 and sends the ADF request message to the selected Transaction Server 558. A round-robin algorithm is used to balance inbound messages among multiple Transaction Servers according to service type.

Parser 562 on Transaction Server 558 receives the ADF message and converts it to a generic request message. Parser 562 is very similar to Parser 518 of Figure SA, except that the field mapping relates to ADF messages, which differ from INAP messages. Nevertheless, all message types (protocols) are converted to the same type of generic request message structure, so that the same Server Application 564 can be used (although different structure fields may be populated). The generic request message is sent to Service Application 564 via communications link 571. After processing the request, Service Application 564 returns via communications link 573 a generic response message to Formatter 566, which converts the generic response message to an ADF message before sending the ADF message to TS Interface 554 on Communications Server 550 via communication link 575. The TS Interface 554 returns an ADF message 565 to switch 560 via X.25 interface 552. As shown in Figure SB, the same Communications Server computer may be used to support multiple message protocol architectures (e.g., INAP, ADF, and so on). However, if performance requires, different Communications Server computers may be allocated to a single message protocol architecture.

As discussed regarding FIG. 5A, Communications Servers may be coupled together, such as by a communications network 577. In an SCP configuration that supports both ADF and INAP messaging, Communications Server 550 may send both ADF and INAP requests to other Communications Servers 579. To process an INAP request at a remote Communications Server (at 579), Communications Server 550 sends the INAP message and corresponding CCR to network interface 581 on communications link 583. In contrast, to process an ADF request at a remote Communications Server, Communications Server 550 sends the ADF message to network interface 581 on communications link 583, but there is no need to send a CCR because no conversational dialog has been initiated to require it.

Figure 6A:
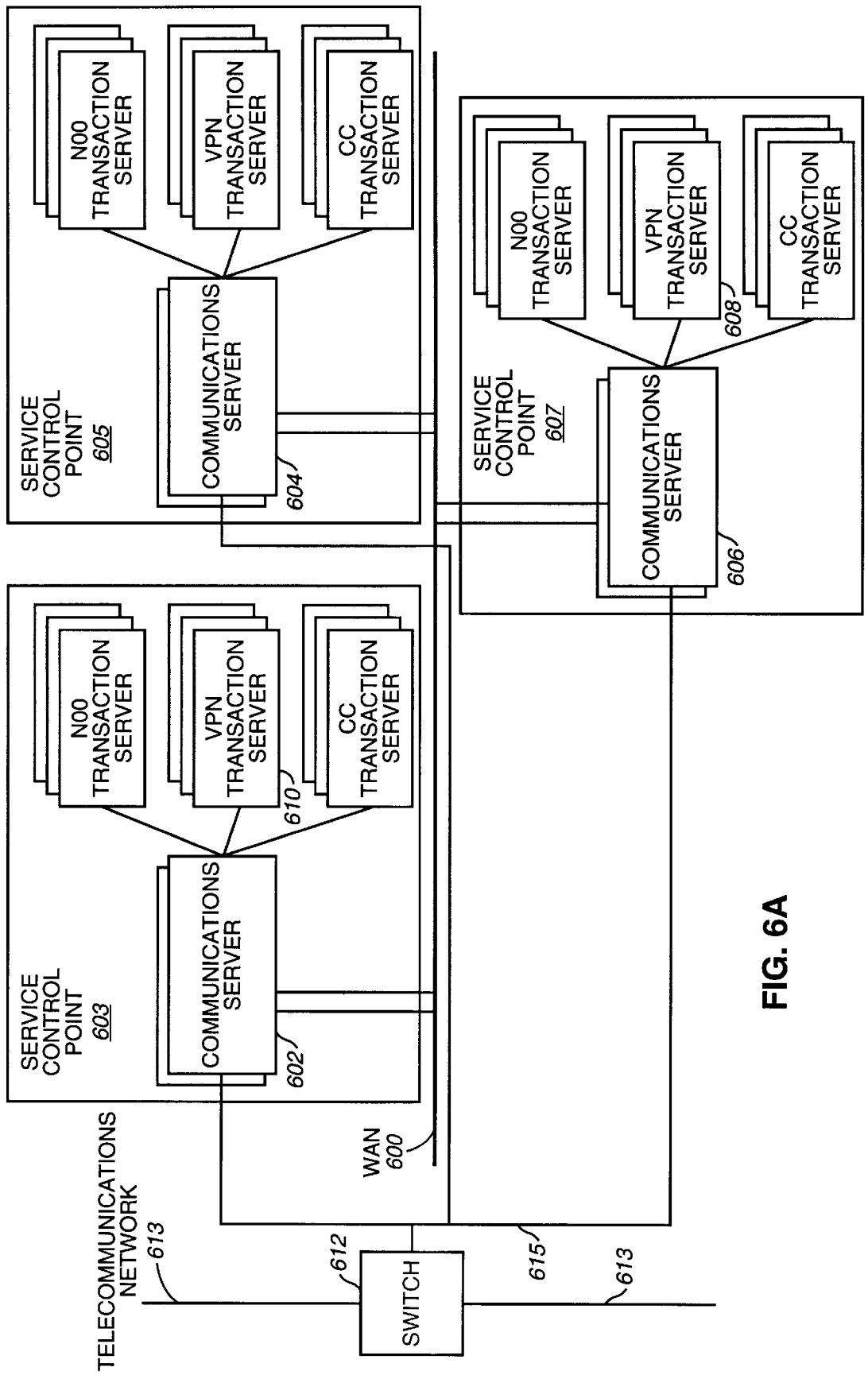
FIG. 6A depicts multiple SCPs coupled by a WAN.

FIG. 6A illustrates the architecture for connecting multiple SCPs on communications network 600, preferably a WAN. Originating switch 612 (connected to telecommunications network 613) is coupled to each SCP via dual data links 615. In an exemplary embodiment in accordance with the present invention, Communications Servers (e.g., 602, 604, and 606) at each SCP are linked to a high-speed WAN. In this manner, Communications Server 602, for example, can send a service request message to a Transaction Server at another SCP (e.g., Transaction Server 608). The service request message (specifically, in this example, the INAP portion of the service request message), the CCR corresponding to the call dialog (Dialog ID), and an ID of the original Communications Server 602 are transmitted to remote SCP 607 for processing. Remote SCP 607 receives this data via its own network interface, which is coupled to its own TS Interface (see, for example, Figures SA and 5B). Because originating switch 612, the respective TCAP interfaces, and the respective TCAP Servers are bypassed, a full TCAP message is not required. For the same reason, the response message must be relayed back through the original Communications Server 602 before being communicated to originating switch 612.

For conversational protocols like INAP, a service can first be invoked at SCP 603 and, subsequently, that same service for that same call can be processed at SCP 605 or SCP 607. For example, a VPN service request message (INAP "PROVIDE INSTRUCTIONS") is sent by a switch to Communications Server 602 on SCP 603. This message is then forwarded to VPN Transaction Server 610 at SCP 603, which processes the request and returns a response message to be sent back to switch 612. The switch then sends a second message (e.g., EVENT) in the VPN call dialog to Communications Server 602 at SCP 603. If, for example, all VPN Transaction Servers at SCP 603 are loaded or otherwise unavailable, Communications Server 602 at SCP 603 can forward this second message (including the CCR and an ID for the original Communication Server at SCP 603) to a VPN Transaction Server (e.g., 608) at SCP 607. Although Communications Server 602 at SCP 603 maintains the dialog with originating switch 612 throughout the call, any VPN Transaction Server at any SCP (such as SCP 607) coupled to the communications network 600 can process messages for this call dialog. This redirection requires Communications Server 602 to send the request message, the CCR, and the ID for the original Communications Server 602 to remote Communications Server 606, which forwards the request to the appropriate Transaction Server 608.

Multiple services can also be provided for a single call, with service distribution specialized among the multiple SCPs coupled to a communications network. In other words, an SCP can be specialized, rather than redundant. Instead of redundantly supporting the same services in all SCPs, each SCP can support a limited number of services (or even a single service) so long as the system is capable of routing service request messages to a specialized SCP supporting the requested service. It may, for example, be desirable to deploy a VPN service only on a certain subset of SCPs, rather than on every SCP in a communications network.

In a system in accordance with the present invention, call context is maintained at the original Communications Server. Therefore, the original Communications Server can distribute service request messages to other specialized SCPs. For example, suppose SCP1 only provides N00 service, and SCP2 only provides VPN service (examples of specialized SCPs). A switch receiving a remote VPN access call (i.e., a multiple service call including both N00 and VPN services) may issue an N00 service request message to a Communications Server in SCP1. A Service Application in SCP1 processes the N00 service request and returns a service response message to the original Communications Server indicating, in part with a transfer record in the CCR, that a VPN service is subsequently required. Rather than returning the response message to the switch, which could then issue a second service request message for VPN to SCP2, Communications Server of SCP1 in accordance with the present invention can receive the service response message from the N00 Transaction Server at SCP1 and issue its own VPN service request message to SCP2, thereby foregoing the detour to the switch.

Figure 6B:
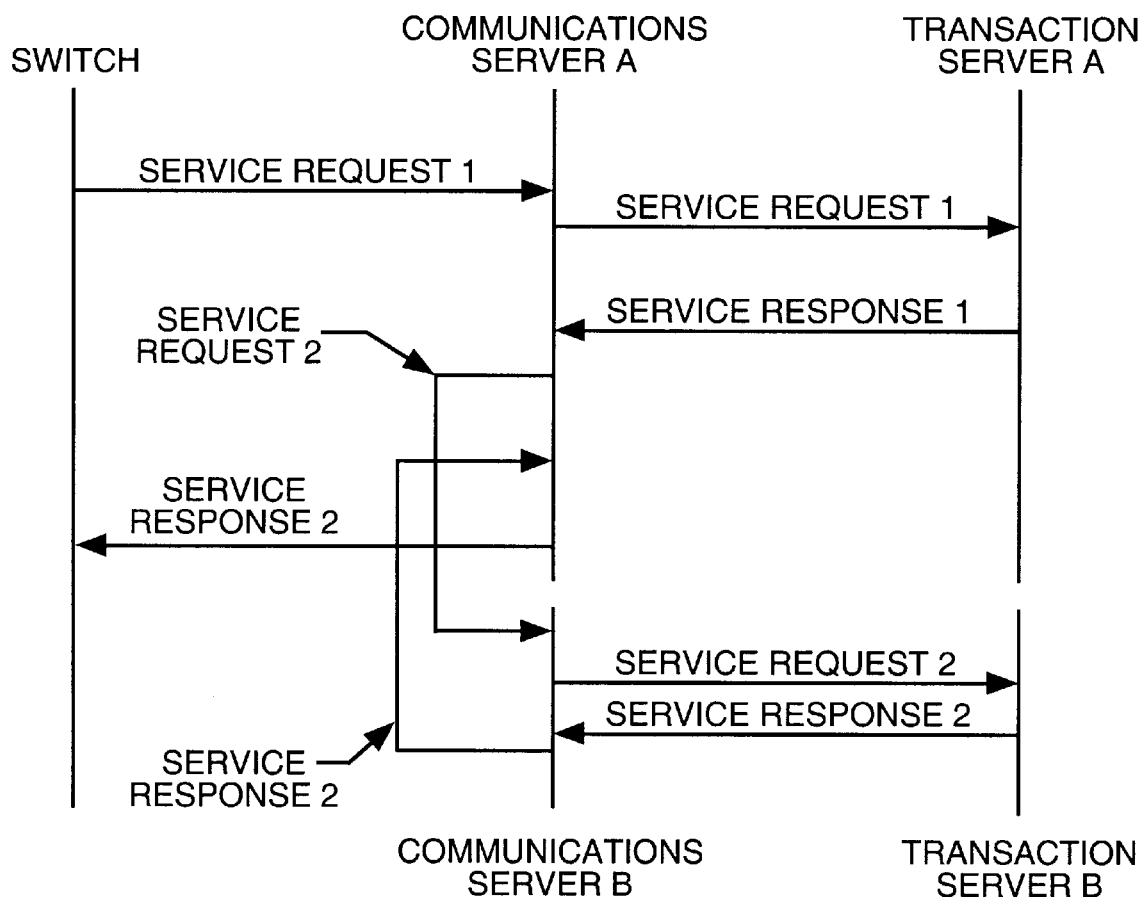
FIG. 6B depicts message flow for a multi-service call performed by multiple SCPs.

FIG. 6B shows a message dialog between a switch and multiple SCPs. As shown, Communications Server A receives service request 1 and sends the request to Transaction Server A. Transaction Server A processes the service request and returns service response 1 to Communications Server A. In accordance with the present invention, service response 1 is accompanied by call context data, which is stored at Communications Server 1 in a CCR. In an exemplary embodiment of the present invention, the first Service Application at Transaction Server A determines that the call is a multiple service call and populates a transfer record in the call context data structure, modifies the Service Key in the generic response data structure to reflect the second service, and provides a flag indicating that the request should be transferred to a second service. In a first exemplary embodiment in accordance with the present invention, when Communications Server A searches its TS List for an available Transaction Server that supports the requested service, the list includes Transaction Servers from other SCPs. A field in the TS List associated with each Transaction Server indicates the Communications Server at which the corresponding Transaction Server is located. Therefore, if Communication Server A finds an available Transaction Server supporting the requested service at a different SCP, it issues the new service request to the other SCP. In another exemplary embodiment in accordance with the present invention, this selection process can be prioritized such that available Transaction Servers supporting the requested service and residing at the current SCP are favored over remote transaction servers. Such priority can be denoted by a priority field associated with each Transaction Server or through other statistical or heuristic means. In an alternate embodiment in accordance with the present invention, the TS List may contain only Transaction Servers residing in the same SCP. In this case, when no Transaction Server that supports the requested service is available at the present SCP, the original Communications Server will forward the request to a designated Communications Server coupled to the WAN. This designation may be accomplished by a round-robin algorithm, or some other priority mechanism.

From such response data, Communications Server A in FIG. 6B determines that a second service is required to complete the call. Using the new Service Key, Communications Server A searches its TS List for an available Transaction Server that supports the requested service. Determining that an appropriate Transaction Server is on another SCP, Communications Server A transmits service request 2 (which includes the service request for the service, the CCR for the call dialog, and an ID for original Communications Server A) across a WAN to Communications Server B, which then forwards service request 2 to Transaction Server B to process the second service. Thereafter, Transaction Server B returns service response 2 to Communications Server B, which returns service response 2 to original Communications Server A (where the call context is maintained). Communication Server A then returns service response 2 to the switch. Subsequent message stages of the second service continue to flow through Communications Server A, which may forward them to any appropriate Transaction Server at any SCP that supports the requested service.

Figure 7A:
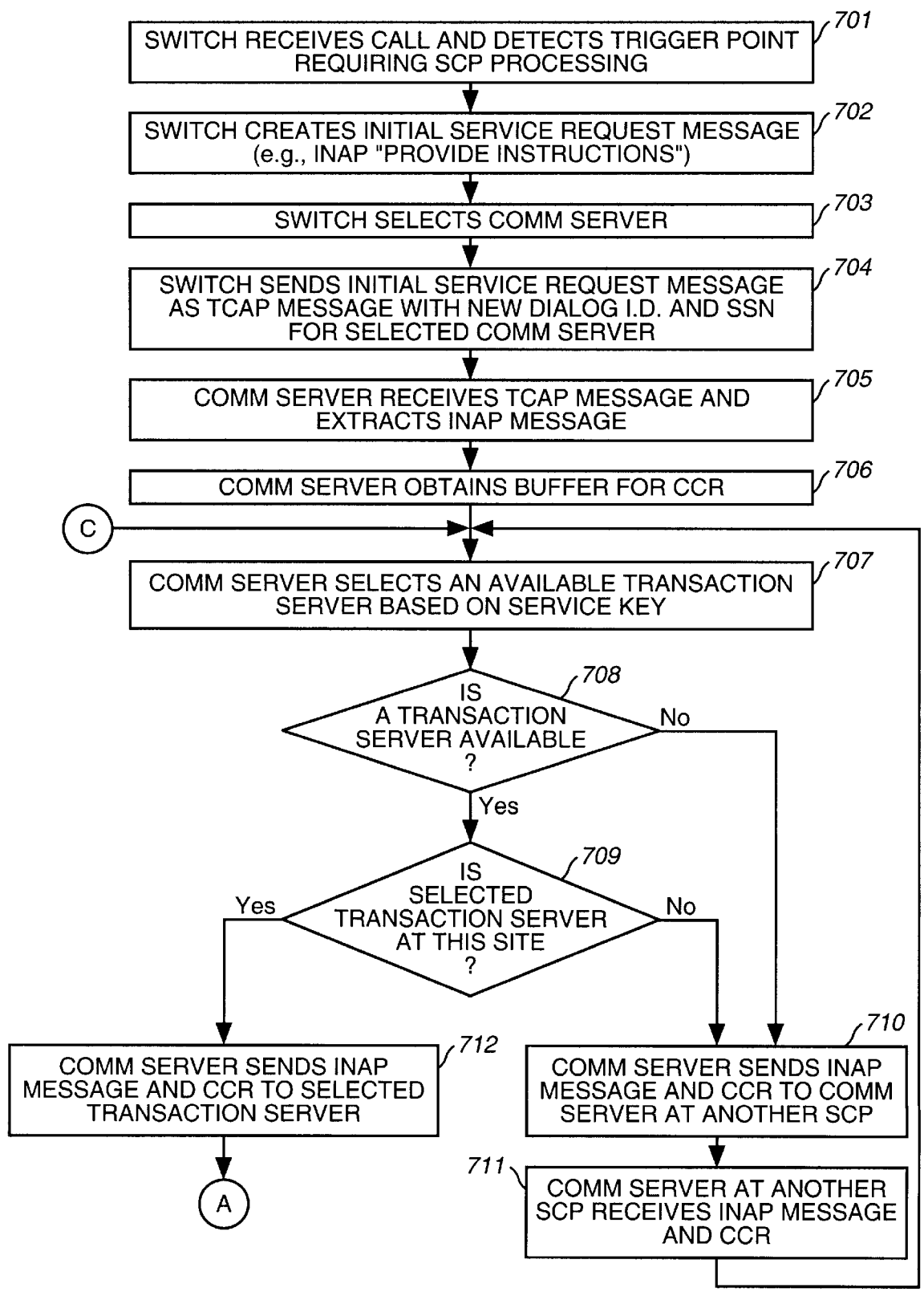
FIGS. 7A, 7B and 7C depict a flow chart for processing a call employing a conversational protocol.
Figure 7B:
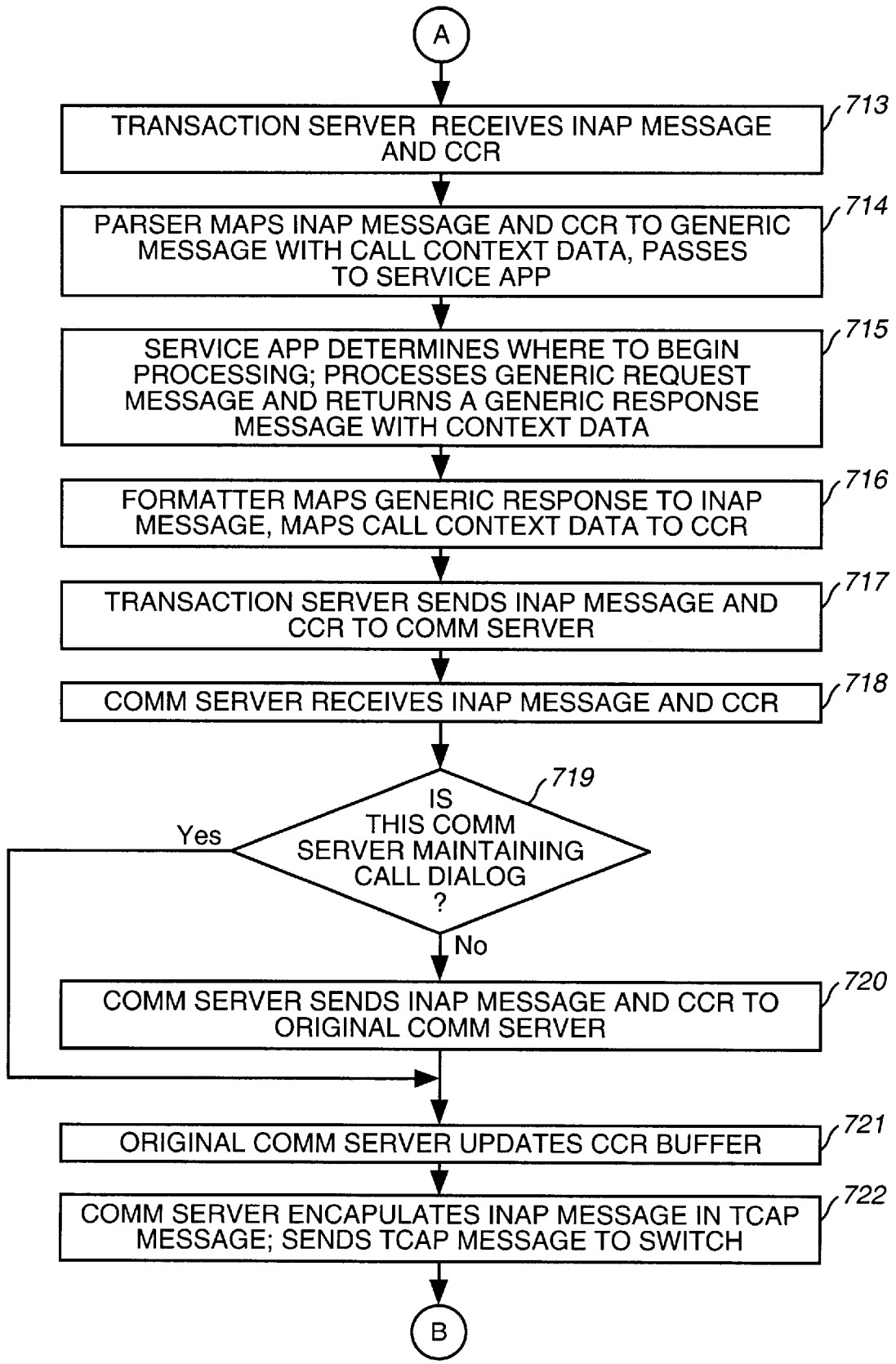
Figure 7C:
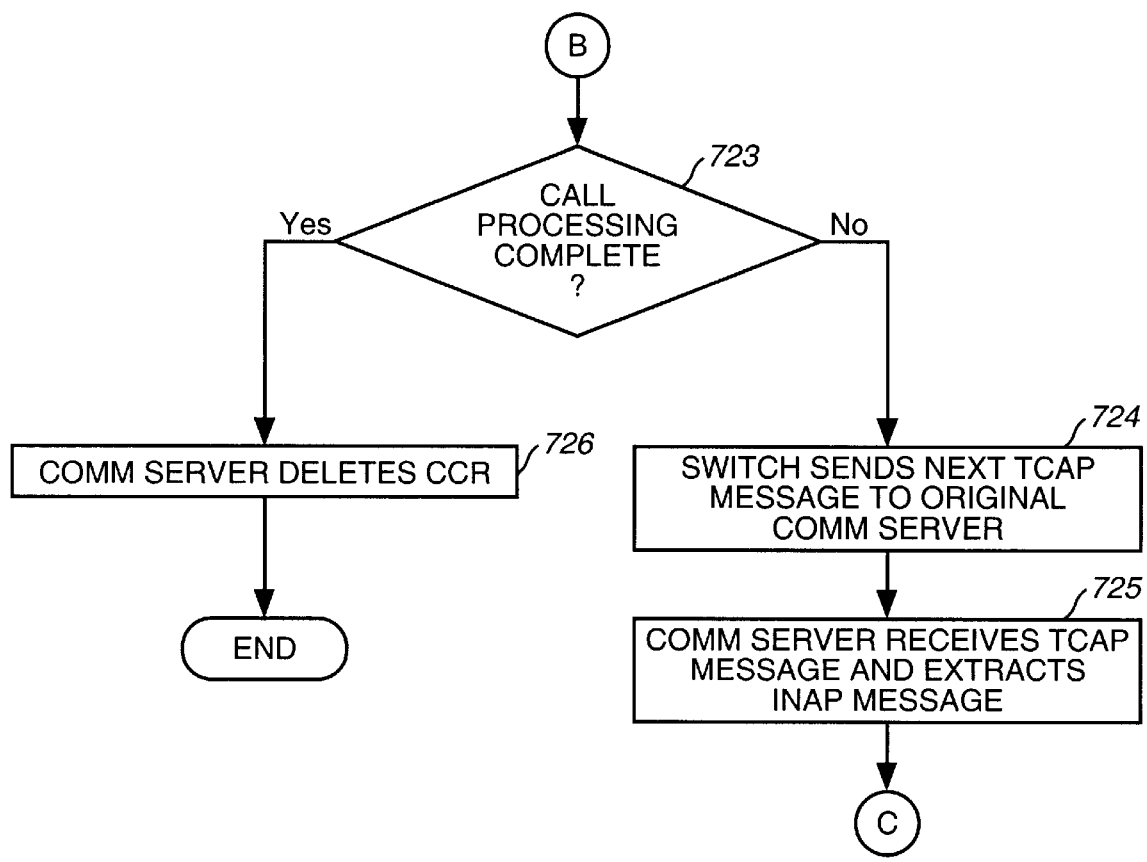

FIGS. 7A, 7B, and 7C depict a flow chart illustrating the process of providing a single service for a call, in accordance with the present invention. A single service refers to a call that executes a single Service Application (for example, a call that is strictly a 1-800 call or a call that is strictly a VPN call).

In step 701, a network switch receives a call. While the switch is processing the call, it encounters a software-based trigger point that causes it to issue a service request message to an SCP. In step 702, the switch creates a service request message, such as an INAP "PROVIDE INSTRUCTIONS" message. In step 703, the switch selects an SCP using a load balancing algorithm. In an exemplary embodiment of the present invention, the switch selects a specific Communications Server (identified by the SSN) at an SCP, and the load balancing algorithm is a round-robin selection process. In step 704, the switch sends the service request message to the selected Communications Server at the selected SCP in the form of a TCAP message over an SS7 network. The TCAP message includes a new Dialog ID that uniquely identifies an SS7 dialog for this particular call, and a sub-system number (SSN) that identifies the specific Communications Server at the SCP.

In step 705, the selected Communications Server has a TCAP Server that extracts the INAP portion of the service request message. In step 706, the Communications Server obtains a memory buffer including a CCR, if it exists, to communicate the call context data to a Transaction Server. In step 707, the Communications Server selects an available Transaction Server based on the Service Key extracted from the INAP message. The Service Key, identifies the type of service associated with the service request message. In Step 708, if no Transaction Server that supports the requested service is available to process the call, then the process proceeds to Step 710. In each SCP, there are multiple redundant Transaction Servers for each service type, clustered in a VAX cluster, for example. One or more Transaction Servers in such a cluster may be unavailable due to failure, overload, or other service-oriented circumstances. In Step 709, the Communications Server determines if the selected Transaction Server and, therefore, the selected Service Application are located at the present SCP site. Step 709 may be unnecessary in a redundant SCP configuration because all SCPs support the same types of Transaction Servers. If the selected Transaction Server is not located at the present site, the process proceeds to Step 710.

In step 710, if no Transaction Server is available at the present SCP site, or no Transaction Server for the appropriate service type is located at the present SCP site, then the Communications Server sends the extracted INAP message, CCR, and an ID for the original Communication Server to a Communications Server at another SCP site. In step 711, the Communications Server at the other SCP site receives the INAP message and CCR, and begins processing as in step 707. In an exemplary embodiment in accordance with the present invention, the other SCP may be designated by a field in the TS List. Alternately, the other SCP site may be selected based on a round-robin algorithm, or other priority algorithm. This process continues until an available Transaction Server for the appropriate service type is found at any SCP, at which point the process proceeds to step 712.

In step 712, the Communications Server sends the INAP message and the CCR to the selected Transaction Server. In step 713, the Transaction Server receives the INAP message and CCR. In step 714, the INAP Parser on the selected Transaction Server maps the INAP message into a generic request message, which is then passed with the generic call context data structure (mapped from the CCR) to the Service Application. In step 715, the Service Application determines where to begin processing, based on the type of INAP message received and, possibly, the call context data. The Service Application processes the request and returns a generic response message with the generic call context data structure, which is sent to the INAP Formatter on the Transaction Server. In step 716, the Formatter maps data from the generic call context data structure to an INAP message and a CCR. In step 717, the Transaction Server sends the INAP message and CCR to the Communications Server.

In step 717, the Communications Server receives the INAP message and CCR from the Transaction Server. Step 719 determines whether the Communications Server in the original SCP is maintaining the call dialog with the switch, based on the Communications Server ID communicated via the WAN Interface. For example, when a switch initiates a call with an original Communications Server, that original Communications Server continues to maintain a call dialog with the switch throughout the duration of the call. If that original Communications Server directs a service request message to a Communications Server at an alternate SCP, the original Communications Server continues to maintain the call dialog and, therefore, also maintains the call context. As such, when the alternate Communications Server returns a response, the response is directed through the original Communications Server before proceeding to the switch. Accordingly, all messages exchanged with the switch within a single call dialog are passed through the original Communications Server, which also maintains the CCR.

In step 721, the original Communications Server updates the CCR buffer with the CCR data received from the Transaction Server. In step 722, the Communications Server encapsulates the INAP message in a TCAP message and sends the TCAP message to the switch over the SS7 network. In step 723, the switch determines whether call processing is complete, based on the INAP response message type. If not, then in step 724, the switch sends the next TCAP message to the same Communications Server with which it initiated the call (i.e., the original Communications Server). In step 725, the Communications Server receives the TCAP message, extracts the INAP message, and updates the call context data using the same CCR buffer throughout call processing for this call dialog. The process continues as before with step 707. When call processing is completed for this call dialog, then in step 726, the original Communications Server deletes the data in the CCR buffer, and the process ends.

In an embodiment of the invention, as illustrated in FIG. 7A, the Communications Server obtains a buffer for a CCR (Step 706) in response to an initial service request message (e.g., INAP "PROVIDE INSTRUCTIONS"). Alternately, an exemplary embodiment in accordance with the present invention may wait to obtain a buffer for a CCR until context data is returned by a Service Application. In such an embodiment, the CCR is created and obtained by the Formatter upon receipt of call context data from a Service Application.

Figure 8A:
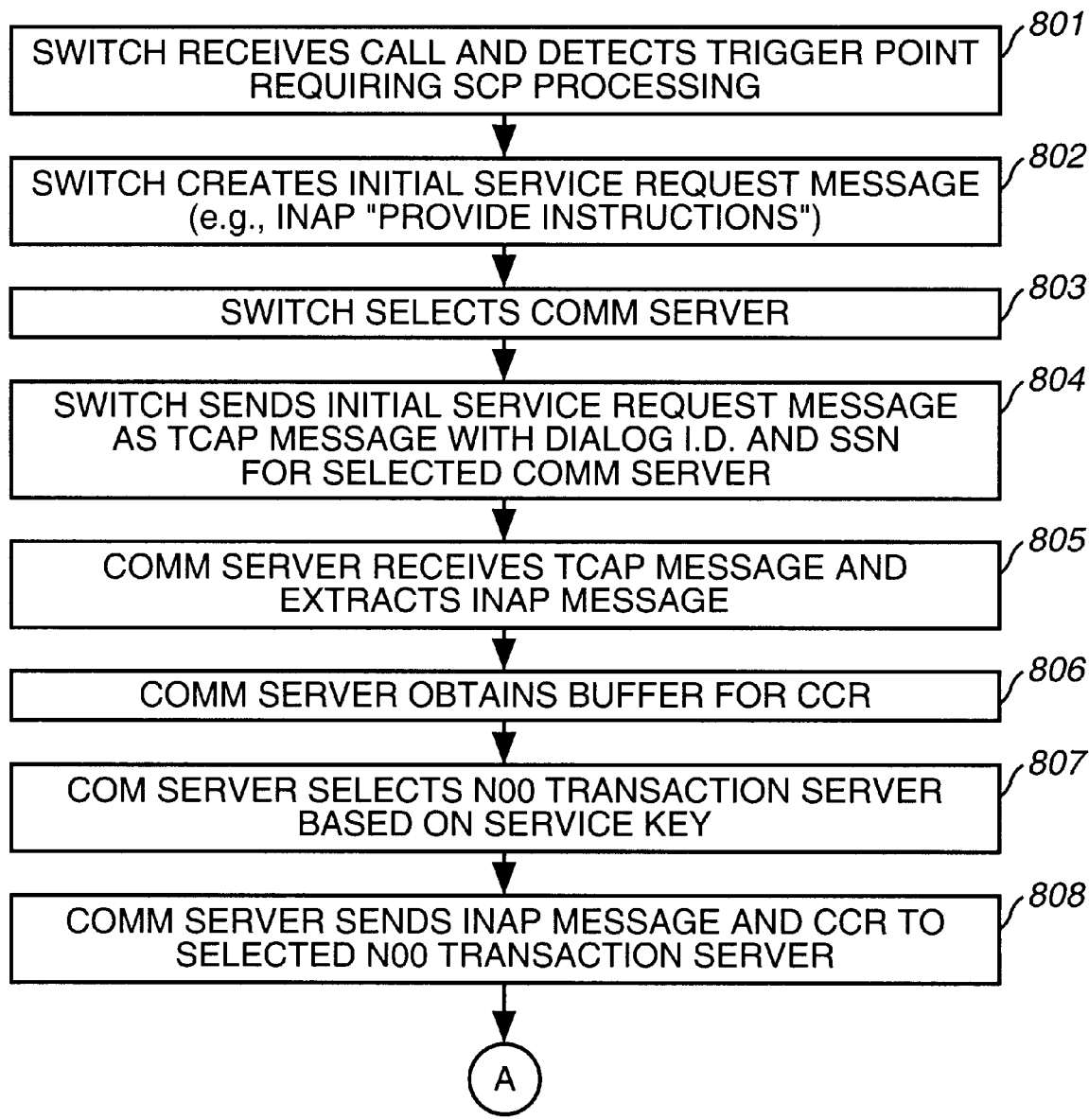
FIGS. 8A, 8B and 8C depict a flow chart for processing a multiple-service call in a single SCP.
Figure 8B:
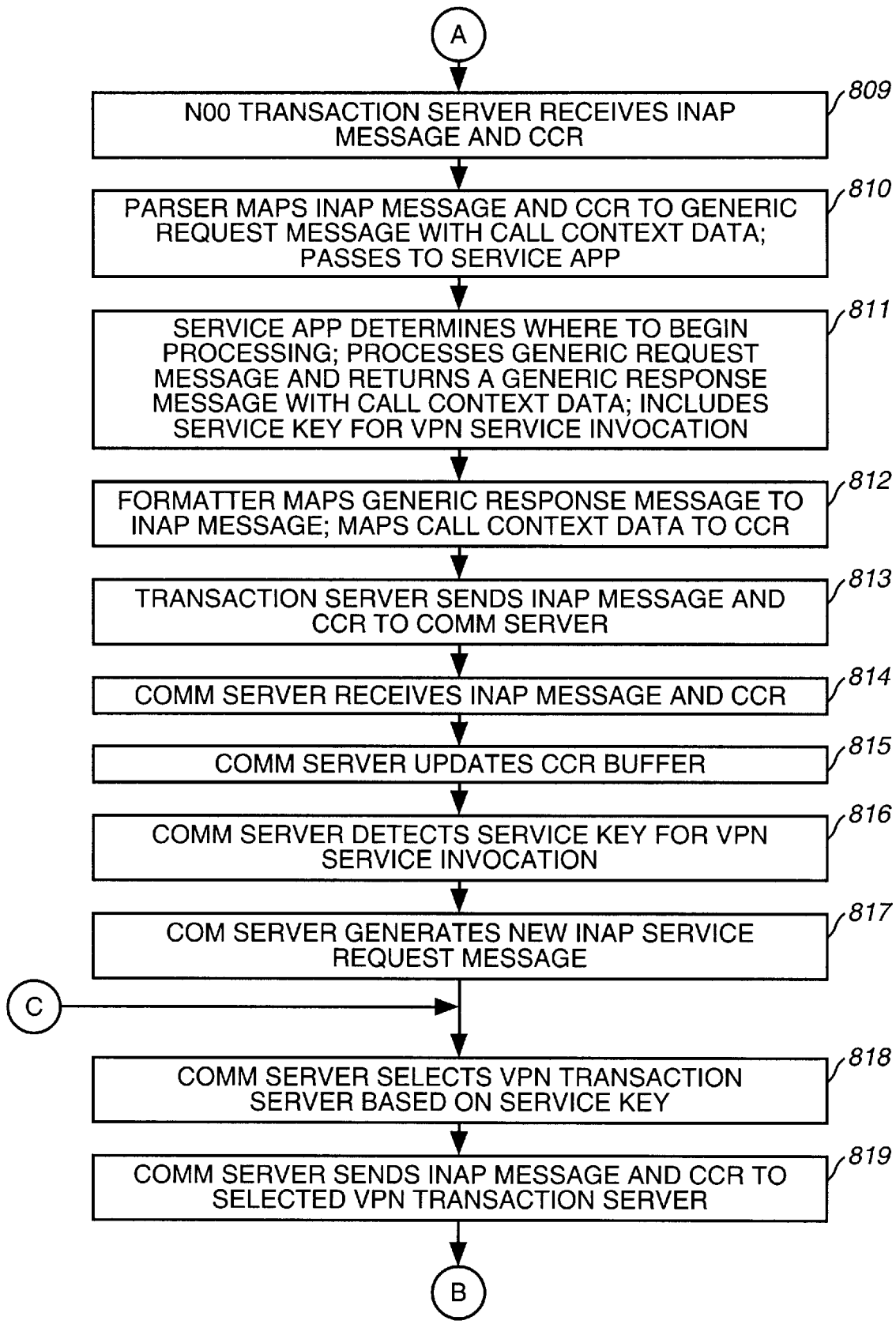
Figure 8C:
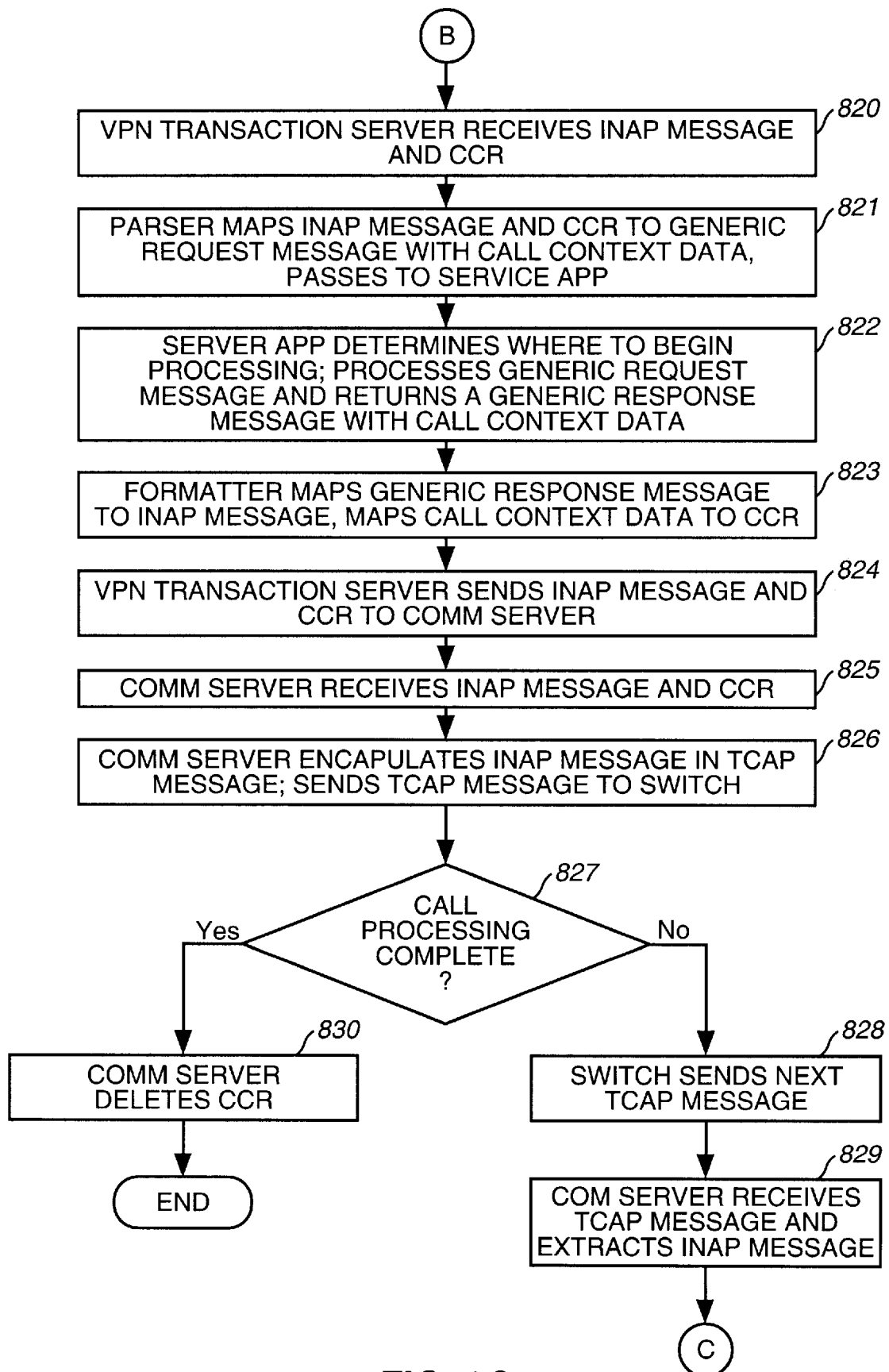
Figure 9A:
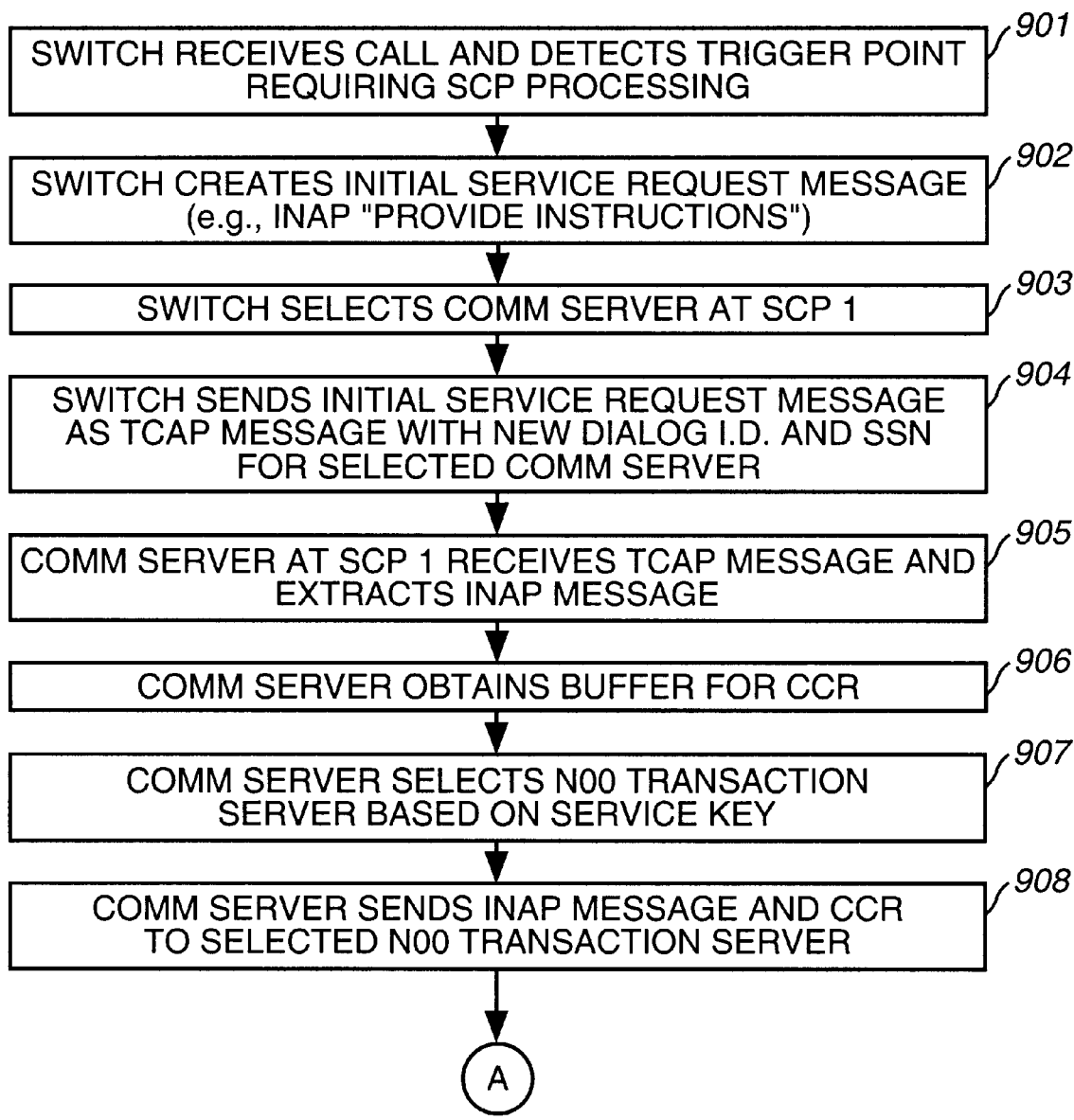
FIGS. 9A, 9B, 9C and 9D depict a flow chart for processing a multiple-service call employing a conversational protocol and multiple SCPs.
Figure 9B:
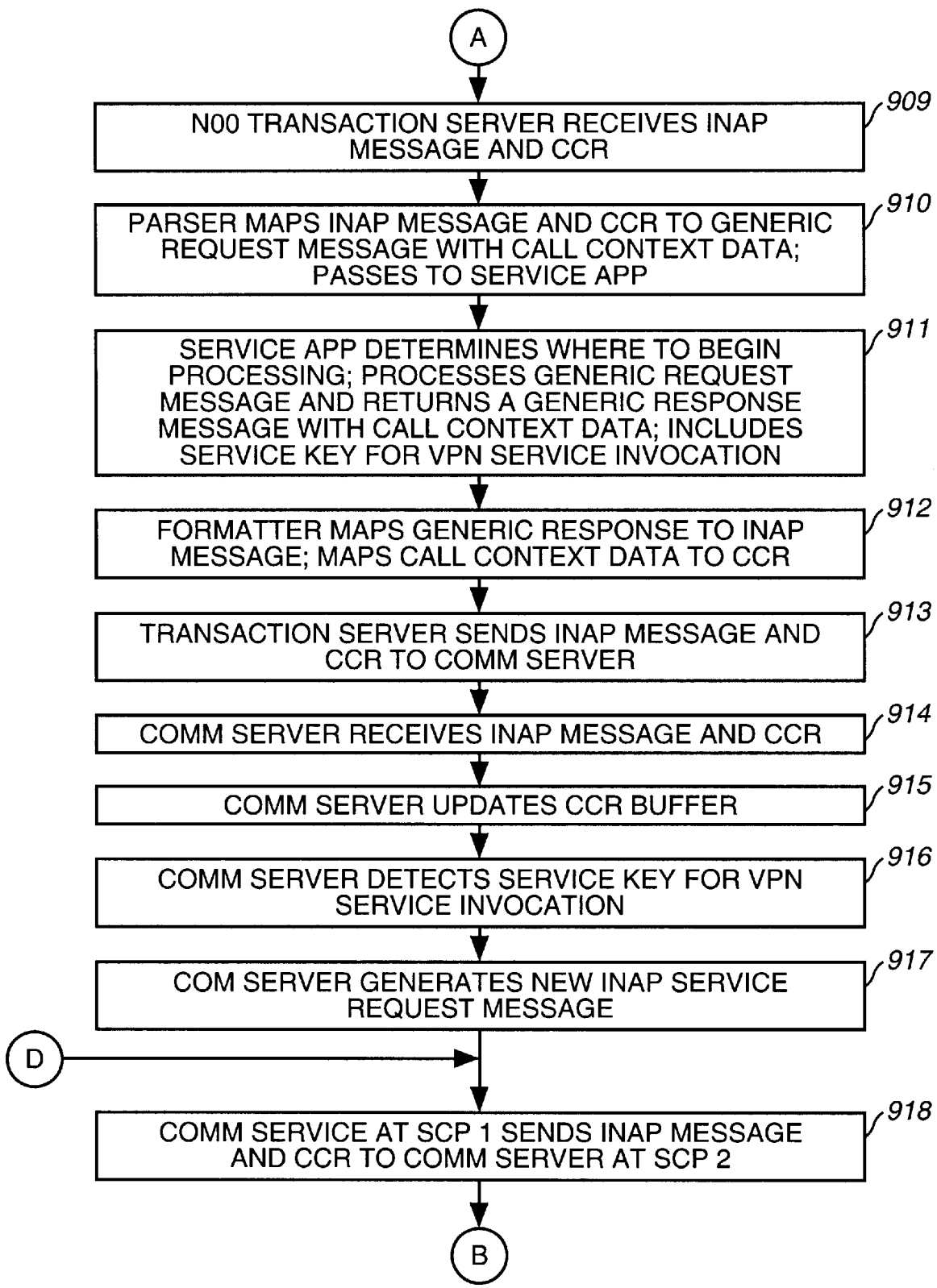
Figure 9C:
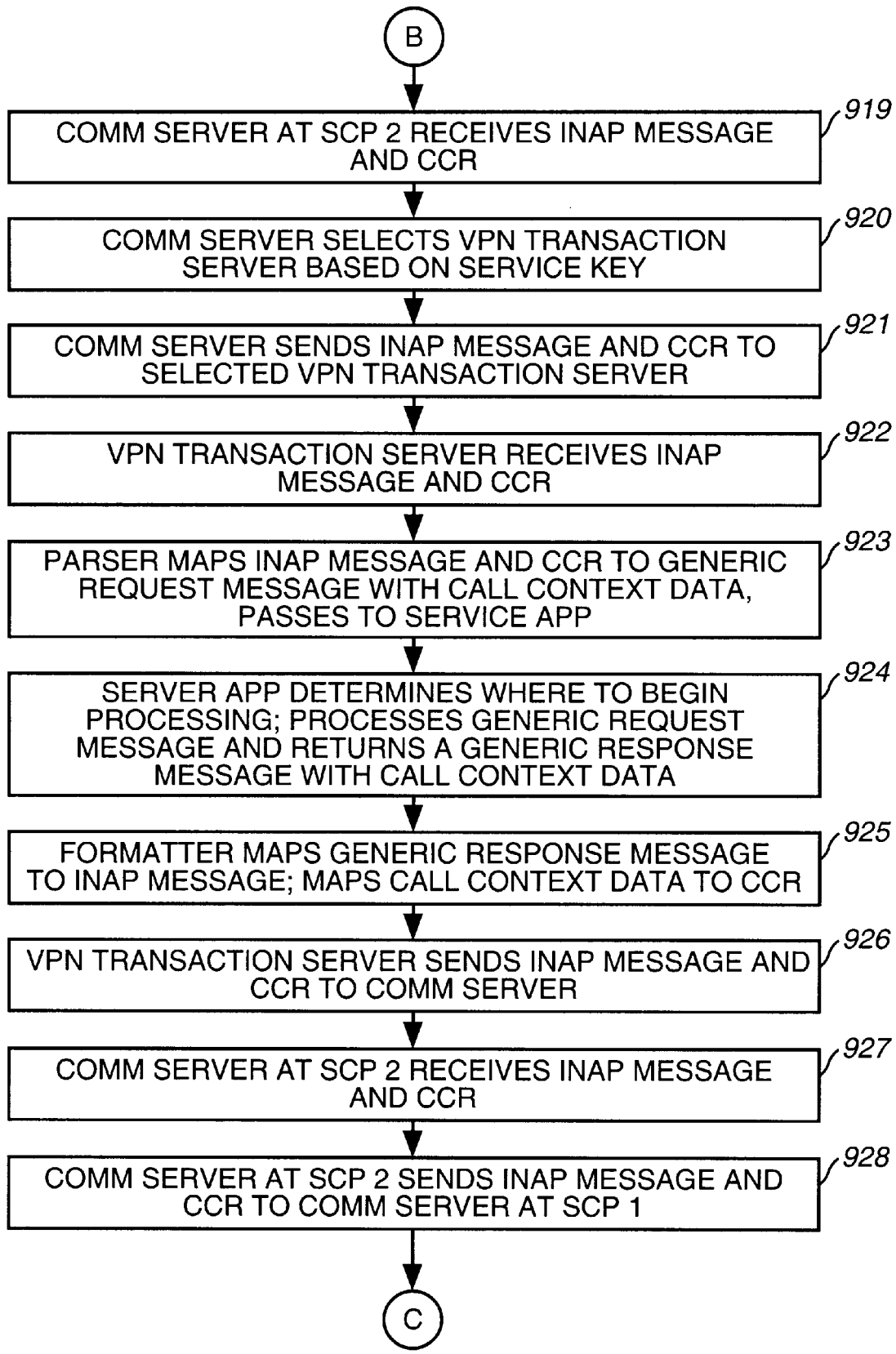
Figure 9D:
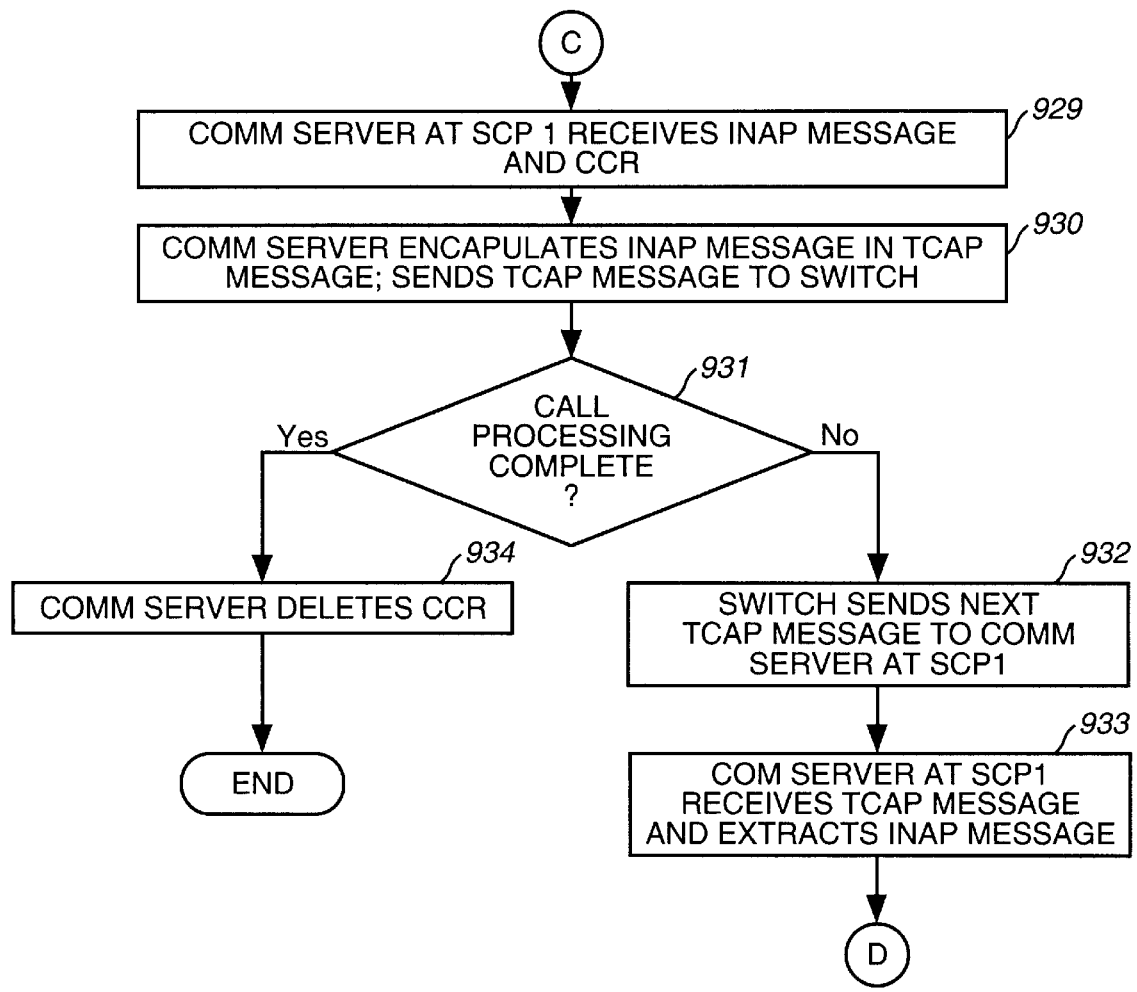

FIG. 8 is a flow chart illustrating the process of an additional feature provided in accordance with the present invention. Multiple services can be provided for a single call, with a first service invoking a second service at the same SCP, without the switch having to invoke the second service. This feature enables intelligence, which would otherwise be placed on the switch, to be migrated to the SCP. It is generally preferable that a single SCP process an entire call. FIG. 7, however, illustrates a single service call being processed on multiple SCPs if the appropriate Transaction Servers at the first SCP are unavailable. In contrast, FIG. 8 illustrates a process where a multiple service call (i.e., where a single call requires execution of more than one Service Application to process completely) is processed by the same SCP, without communicating with the switch between services. For example, in an exemplary embodiment in accordance with the present invention, a remote VPN access service requires both a VPN service and an N00 service to complete the call. MCI Communications Corporation's VPN service, VNET™, provides a remote access feature in which a 1-800 number is dialed to access a VPN platform. A first service, supporting 1-800 processes as part of the N00 Transaction Server is invoked, which results in the determination that a second service (for VPN) must be invoked. As such, the service returns a response message with a transfer record in the call context data to the Formatter, and then to the Communications Server. In accordance with this invention, the Communications Server, rather than the switch, evaluates the response message and transfer record and issues a service request to a VPN Transaction Server within the same SCP, if the response message and transfer record indicate that the VPN Service Application must be invoked. In an exemplary embodiment in accordance with the present invention, the transfer record includes data specifying whether the access is remote or registered, global switch data, point of entry data, point of origin data, and other formatting data. Generally, the transfer record includes context information that is passed between an N00 service and a VPN service.

In FIG. 8, steps 801–810 are described before, corresponding to equivalent steps illustrated in FIG. 7, with specific application to an N00 call. In step 811, the N00 Service Application processes the service request message and determines that this particular N00 call is for a VPN remote access service. The N00 Service Application returns a response message that includes a Service Key and a transfer record for VPN service invocation. Steps 812–815 are as described before, relating to FIG. 7. In step 816, the Communications Server detects the Service Key for VPN service invocation, and as a result, in Step 817, the Communications Server generates a new INAP service request message, such as an INAP "PROVIDE INSTRUCTIONS", message for VPN service. In step 818, the Communications Server selects a VPN Transaction Server, and in step 819, the Communications Server sends the new INAP message and CCR to the selected VPN Transaction Server.

In steps 820–824, the VPN Transaction Server processes the service request message and returns a service response message. In step 825–829, the Communications Server processes and forwards the service response message to the switch, and engages in additional message exchanges until call processing completes for the current call dialog. In step 830, the Communications Server deletes the data in the CCR buffer, and the process ends.

FIG. 9 is a flow chart illustrating the process shown in FIG. 8, but in which a second service (e.g., VPN) is invoked on a second SCP. The second service is invoked by the original Communications Server on the first SCP, so that the switch need not be involved to process the second service. As a result, multiple services may be implemented using a specialized service distribution architecture, in which SCPs are specialized rather than redundant. Alternately, this same process can also be applied to redundant service distribution architectures, in a situation where a needed Transaction Server at the first SCP is unavailable (as illustrated in FIG. 7). The process illustrated in FIG. 9 comprises a multi-service call (a 1-800 remote VPN access service).

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

Moreover, while there have been described herein the principles of the present invention in conjunction with specific hardware and software, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A system for processing a call received from a switch, said call having a first service request message that includes a dialog identifier and defines a first stage of said call, said system comprising:
   a switch interface couple to receive said first service request message from said switch;
   a storage device coupled to said switch interface;
   a call context data record that is stored in said storage device with reference to said dialog identifier; and
   a first service application coupled to receive said first service request message and said call context data record from said switch interface for processing said first stage of said call based on said first service request message and said call context data record, said first service application executes in a transaction server coupled to receive said first service request message and said call context data record from said switch interface.

2. The system of claim 1 wherein said call further includes a second service request message having said dialog identifier and defining a second stage of said call, said system further comprising:
   a second service application coupled to receive said second service request message and said call context data record from said switch interface for processing said second stage of said call based on said second service request message and said call context data record, said second service application executes in a transaction server coupled to receive said second service request message and said call context data record from said switch interface.

3. The system of claim 1 further comprising a service response message that stores a result of the processing by said first service application.

4. The system of claim 1 wherein said switch interface comprises a first communications server coupled to receive said first service request message from said switch.

5. The system of claim 4 wherein said first communications server further comprises a network interface for coupling said first communications server with a second communications server.

6. The system of claim 1 wherein said first service application executes in a transaction server coupled to receive said first service request message and said call context data record from said switch interface.

7. A system for processing a call received from a switch, said call having a first service request message that includes a dialog identifier and defines a first stage of said call, said system comprising:
   a switch interface coupled to receive said first service request message from said switch;

a context storage device coupled to said switch interface for storing a call context data record with reference to said dialog identifier; and a transaction server for executing a first service application coupled to receive said first service request message and said call context data record from said switch interface and to process said first stage of said call based on said first service request message and said call context data record.

8. A transaction server for processing a call defined by a protocol-specific service request message received from a communications server, said transaction server comprising:

a parser that generates a generic service request message based upon said protocol-specific service request message;

a service application that receives said generic service request message from said parser and processes said generic service request message to generate a generic service response message; and a formatter that receives said generic service response message from said service application and generates a protocol-specific response message to send to said communications server.

9. A communications server coupled to receive a service request message having a service key from a switch, said communications server comprising:

a conversational protocol interface coupled to receive said service request message from said switch;

a protocol server coupled to said conversational protocol interface for extracting a protocol-specific service request from said service request message;

a transaction server list of one or more transactions servers coupled to said communications server; and a transaction server interface coupled to receive said protocol-specific service request from said protocol server, said transaction server interface being capable of selecting one of said transaction servers from said transaction server list based on said service key and sending said protocol-specific service request to said selected transaction server.

10. The system of claim 9 wherein said service request message includes a dialog identifier, said system further comprising:

a call context data record list coupled to said transaction server interface for storing one or more available call context data records; said transaction server interface being capable of selecting one of said available call context data records from said call context data record list based on said dialog identifier and sending said selected call context data record to said selected transaction server.

11. A system for processing a call received from a switch, said call comprising a request message that includes a protocol-specific service request message and dialog identifier, said system comprising:

means for receiving said request message from a switch;

means for storing a call context data record associated with said call;

means for extracting said protocol-specific service request message from said request message;

means for processing said call based on said protocol-specific service request message and said call context data record;

means for modifying said call context data record to reflect the processing of said call by a service application; and means for returning said call context data record to said means for storing.

12. A system for processing a call received from a switch, said call comprising a request message that includes a protocol-specific service request message and dialog identifier, said system comprising:

means for receiving said request message from a switch;

means for storing a call context data record associated with said call;

means for extracting said protocol-specific service request message from said request message;

means for parsing said protocol-specific service request message to produce a generic service request message;

means for processing said call based on said generic service request message and said call context data record;

means for modifying said call context data record to reflect the processing of said call by a service application; and means for returning said call context data record to said means for storing.

13. The system of claim 12 further comprising:

means for returning a generic service response message from said means for processing, said generic service response message defining a processing result from said means for processing;

means for formatting said generic service response message into a protocol-specific service response message; and means for encapsulating said protocol-specific service response message into a service response message for transmission to said switch.

14. A method for processing in a service control point a request message having a dialog identifier and a service key, said method comprising:

storing at least one call context data record in said service control point;

receiving said request message in said service control point;

selecting one of said at least one call context data record based on said dialog identifier of said request message;

selecting a service application based on said service key, said service application having a processing sequence including multiple stages;

sending said request message and said selected call context data record to said selected service application;

processing said request message beginning at a proper processing point in said selected service application according to said request message and said selected call context data record;

modifying said selected call context data record responsive to said processing of said request message; and storing said selected call context data record at said service control point, responsive to said modifying step.

15. A system for processing a multiple service call from an originating switch, said call requesting a first service identified by a first service key in a first service request message received from said originating switch, said system comprising:

a first service application coupled to receive and process said first service request message, said first service application being capable of generating a first service response message having a second service key indicating a second service;

a second service application associated with said second service key;

a call context data record stored in a storage device in said system and resulting from said first service; and a switch interface coupled to said first and second service applications that, responsive to said second service key of said first service response message, generates a second service request message including said second service key, said switch interface being capable of selecting said second service application associated with said second service key and sending said second service request message and said call context data record to said second service application for processing said second service.

16. The system of claim 15 wherein said first and second service applications are executing in a single service control point.

17. The system of claim 15 wherein said first service application executes in a first service control point and said second service application executes in a second service control point, said first and second service control points being coupled by a data communication network, bypassing said originating switch.

18. The system of claim 15 further comprising a transfer response record passed by said first service application in said call context data record to said switch interface, said transfer response record being passed to said second service application for use in processing said second service.

19. A method for processing a call from an originating switch requesting a first service and a second service, said method comprising:

storing a call context data record in a service control point having a switch interface;

receiving a request message having a dialog identifier and a service key;

sending said call context data record and said request message from said switch interface to a first service application selected based on said service key;

processing said request message in said first service application to modify said call context data record;

returning said call context data record and a response message including a second service key to said switch interface;

sending a second request message including said second service key and said call context data record to a second service application selected based on said second service key; and processing said second request message in said second service application, based on said call context data record.

20. The method of claim 19 wherein the step of processing in said first service application comprises the step of processing said request message in said first service application executing in a first service control point.

21. The method of claim 19 wherein the step of processing in said second service application comprises the step of processing said second request message in said second service application executing in a second service control point.

22. The method of claim 19 wherein the step of sending to a second service application comprises the step of transmitting said second service key and said call context data record to a second switch interface in a second service control point via a communications network that bypasses said originating switch.

23. A system for processing a call received from a switch, said call comprising a first service and a second service, said call being initiated by a first service request message having a dialog identifier and a first service key that indicates said first service, said system comprising:

a first service control point having a first switch interface coupled to said switch;

a storage device coupled to said first switch interface;

a call context data record stored in said storage device and associated with said call based on said dialog identifier, said call context data record including a transfer response field;

a first service application executing in said first service control point and being coupled to receive said first service request message and said call context data record from said first switch interface, said first service application being selected to process said first service request message based on said first service key;

a first service response message passed by said first service application in said call context data record to said first switch interface;

a second service control point having a second switch interface coupled to said first switch interface;

a second service application executing in said second service control point for processing said second service;

a transfer response record passed by said first service application in said call context data record to said first switch interface;

a second service request message generated by said first switch interface and sent to said second service application, said transfer response record including data required to transfer said second service request message to said second service application; and a second service response message generated by said second service application and sent to said first switch interface.

24. A program storage media, readable by a computer, tangibly embodying a program of instructions executable by said computer for processing in a service control point a request message having a dialog identifier and a service key, the program comprising instructions for:

storing at least one call context data record in said service control point;

receiving said request message in said service control point;

selecting one of said at least one call context data record based on said dialog identifier of said request message;

selecting a service application based on said service key, said service application having a processing sequence including multiple stages;

sending said request message and said selected call context data record to said selected service application;

processing said request message beginning at a proper processing point in said selected service application according to said request message and said selected call context data record;

modifying said selected call context data record responsive to said processing of said request message; and storing said selected call context data record at said service control point, responsive to said modifying step.

25. A program storage media, readable by a computer, tangibly embodying a program of instructions executable by said computer for processing a call from an originating switch requesting a first service and a second service, the program comprising instructions for:

storing a call context data record in a service control point having a switch interface;

receiving a request message having a dialog identifier and a service key;

sending said call context record and said request message from said switch interface to a first service application selected based on said service key;

processing said request message in said first service application to modify said call context record;

returning said call context data record and a response message including a second service key to said switch interface;

sending a second request message including said second service key and said call context data record to a second service application selected based on said second service key; and processing said second request message in said second service application, based on said first context data record.

* * * * *